(12) United States Patent
Blacken et al.

(10) Patent No.: US 12,191,619 B2
(45) Date of Patent: Jan. 7, 2025

(54) METHOD, SYSTEM, AND COMPUTER PROGRAM PRODUCT FOR WIRE CONNECTOR ASSEMBLY

(71) Applicant: THE BOEING COMPANY, Chicago, IL (US)

(72) Inventors: Lars E. Blacken, Bothell, WA (US); Heiko Hoffmann, Simi Valley, CA (US); Damien O. Martin, Everett, WA (US); Jeffrey McCaskey, Chicago, IL (US); Bradley J. Mitchell, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 420 days.

(21) Appl. No.: 17/660,320

(22) Filed: Apr. 22, 2022

(65) Prior Publication Data

US 2023/0344185 A1    Oct. 26, 2023

(51) Int. Cl.
*H01R 43/20* (2006.01)
*B25J 9/16* (2006.01)
*G05B 19/4155* (2006.01)

(52) U.S. Cl.
CPC ............ *H01R 43/20* (2013.01); *B25J 9/1687* (2013.01); *G05B 19/4155* (2013.01); *G05B 2219/50391* (2013.01)

(58) Field of Classification Search
CPC ........ H01R 43/20; B25J 9/1687; G06T 7/001; G06T 7/73
See application file for complete search history.

(56) References Cited

U.S. PATENT DOCUMENTS 4,567,610 A      1/1986  McConnell
4,787,138 A  *  11/1988  Eaton ................... H01R 43/20
                                                                29/748
(Continued)

FOREIGN PATENT DOCUMENTS

EP          0182951 A2     5/1986
EP          2783802 A2    10/2014
(Continued)

OTHER PUBLICATIONS

"Eroding and Dilating," OpenCV Tutorials, (2019). [<URL: https://docs.opencv.org/2.4/doc/tutorials/imgproc/erosion_dilatation/erosion_dilatation.html>].

(Continued)

*Primary Examiner* — Khoi H Tran
*Assistant Examiner* — Tristan J Greiner
(74) *Attorney, Agent, or Firm* — Yee & Associates, P.C.

(57) ABSTRACT

A method, system and computer program product are provided for automated insertion of a wire contact into an insertion hole of a connector. Methods include: controlling a robot having an end-effector to position a wire contact proximate to a connector using a wire gripper and a separator device of the end-effector; controlling the robot to advance the separator device between two or more wires previously connected to the connector; controlling the robot to align the wire contact with a insertion hole of the connector; controlling the robot to advance the wire contact toward the insertion hole of the connector and at least partially insert the wire contact into the insertion hole; controlling the robot to release the wire contact from the wire gripper; and controlling the robot to withdraw the wire gripper and the separator device from between the two or more wires previously connected to the connector.

20 Claims, 19 Drawing Sheets

(56) References Cited

U.S. PATENT DOCUMENTS

| | | | |
|---|---|---|---|
| 5,459,924 A * | 10/1995 | Ohsumi | H01R 43/20 29/33 F |
| 5,537,741 A * | 7/1996 | Peterson | G05B 19/4182 29/748 |
| 5,598,628 A * | 2/1997 | Maejima | H01R 43/20 29/760 |
| 5,737,500 A | 4/1998 | Seraji et al. | |
| 6,711,293 B1 | 3/2004 | Lowe | |
| 8,494,304 B2 | 7/2013 | Venable et al. | |
| 8,670,619 B2 | 3/2014 | Funayama et al. | |
| 9,555,549 B2 | 1/2017 | Motoyoshi et al. | |
| 10,288,410 B2 | 5/2019 | Hoffman | |
| 10,825,259 B2 | 11/2020 | Kim et al. | |
| 11,151,405 B1 | 10/2021 | Hoffmann | |
| 11,171,459 B2 | 11/2021 | Hoffmann | |
| 11,374,374 B2 | 6/2022 | Graber-Tilton et al. | |
| 2005/0254699 A1 | 11/2005 | Sano et al. | |
| 2007/0019868 A1 | 1/2007 | Takai et al. | |
| 2015/0120047 A1 | 4/2015 | Motoyoshi et al. | |
| 2016/0064888 A1* | 3/2016 | Katou | G01B 11/002 29/748 |
| 2016/0073584 A1* | 3/2016 | Davidson | A01D 46/30 294/198 |
| 2017/0140539 A1* | 5/2017 | Wang | B25J 9/1697 |
| 2017/0151673 A1 | 6/2017 | Kobayashi et al. | |
| 2017/0160077 A1 | 6/2017 | Featherstone et al. | |
| 2017/0243357 A1 | 8/2017 | Peng et al. | |
| 2017/0320213 A1 | 11/2017 | Helmick et al. | |
| 2018/0108458 A1 | 4/2018 | Maki et al. | |
| 2018/0130218 A1 | 5/2018 | Hoffman | |
| 2019/0184570 A1* | 6/2019 | Yung | B25J 9/163 |
| 2020/0180157 A1* | 6/2020 | Ueda | B25J 9/1015 |
| 2020/0306993 A1 | 10/2020 | Smith et al. | |
| 2020/0346349 A1 | 11/2020 | Chung et al. | |
| 2021/0016438 A1 | 1/2021 | Pivac | |
| 2021/0370510 A1* | 12/2021 | Mao | B25J 13/086 |
| 2021/0399470 A1 | 12/2021 | Hoffmann | |
| 2022/0234208 A1 | 7/2022 | Hoffmann et al. | |

FOREIGN PATENT DOCUMENTS

| | | | |
|---|---|---|---|
| JP | H05-62757 A | 3/1993 | |
| JP | 2004-119046 A | 4/2004 | |
| JP | 2016-058320 A | 4/2016 | |
| WO | WO 2015/124756 A1 | 8/2015 | |
| WO | WO 2015/156793 A1 | 10/2015 | |

OTHER PUBLICATIONS

"Feature Matching + Homography to find Objects," OpenCV-Python Tutorials, (2013). [<URL: https://opencv-python-tutroals.readthedocs.io/en/latest/py_tutorials/py_feature_homography.html#feature-homography>].

Borgefors, G., "Distance Transformations in Digital Images," Comput. Vision Graph. Image Process., 34(3): 344-371, (1986).

Canny, J., "A Computational Approach to Edge Detection," IEEE Trans. Pattern Analysis and Machine Intelligence, 8(6):679-698, (1986).

Choe, Y. et al., "Vision-Based Estimation of Bolt-Hole Location using Circular Hough Transform," ICCAS-SICE 2009—ICROS-SICE International Joint Conference 2009, Proceedings, art. No. 5334375, pp. 4821-4826, (2009).

Cui, M. et al., U.S. Appl. No. 17/660,327 for "Method and System for Machine Determining Wire Contact Insertion", filed Apr. 22, 2022.

Davies, E.R. et al., "An Analysis of Hole Detection Schemes," Proc. British Machine Vision Assoc. Conf., Oxford (Sep. 24-27), pp. 285-290, (1990).

Duda, R.O. et al., "Use of the Hough Transformation to Detect Lines and Curves in Pictures," Comm. ACM, 15(1): 11-15, (1972).

Fitzgibbon, A.W. et al., "A Buyer's Guide to Conic Fitting," Proc. 5th British Machine Vision Conference, Birmingham, pp. 513-522, (1995).

Girshick, R., et al., "Rich feature hierarchies for accurate object detection and semantic segmentation," In Proceedings of the 2014 IEEE Conference on Computer Vision and Pattern Recognition (CVPR '14). (IEEE Computer Society, Washington, DC, USA), 580-587, (2014).

Girshick, R., "Fast R-CNN," In proceedings of the 2015 IEEE International Conference on Computer Vision (ICCV) (ICCV '15), (IEEE Computer Society, Washington, DC, USA), 1440-1448, (2015).

Hu, M-K., "Visual Pattern Recognition by Moment Invariants," IRE Transactions on Information Theory, 8(2):179-187. (1962).

Komax Zeta Wire Bundle Assembly Machine, Zeta 640/650 Harness Manufacturing, Komax Group, 12 pages.

Laursen, J.S. et al., "Automatic Error Recovery in Robot Assembly Operations Using Reverse Execution," 2015 IEEE/RSJ International Conference on Intelligent Robots and Systems (IROS), Hamburg, pp. 1785-1792, (2015).

Liao, S. et al., "Learning Multi-Scale Block Local Binary Patterns for Face Recognition," International Conference on Biometrics (ICB), pp. 828-837, (2007).

Lienhart, R. et al., "An Extended Set of Haar-like Features for Rapid Object Detection," IEEE ICIP, pp. 1-900-1-903, (2002).

Lindeberg, T., "Detecting Salient Blob-Like Image Structures and Their Scales with a Scale-Space Primal Sketch: a Method for Focus-of-Attention," International Journal of Computer Vision, 11(3):283-318, (1993).

Liu, W. et al., "SSD: Single Shot Multibox Detector," In European conference on computer vision. 21-37, (2016).

Loborg, P., "Error Recovery in Automation—an Overview," AAAI Technical Report SS-94-04, pp. 94-100, (1994).

Lowe, D., "Distinctive Image Features from Scale-Invariant Keypoints," Int. J. Computer Vision, 60(2):91-110, (2004).

Meyer, F., "Color Image Segmentation," In IEEE Fourth International Conference on Image Processing and its Applications, pp. 303-306, (1992).

Penate-Sanchez, A. et al., "Exhaustive Linearization for Robust Camera Pose and Focal Length Estimation," In IEEE Trans. on Pattern Analysis and Machine Intelligence, pp. 1-14, (2013).

Press, W.H., et al., "Minimization or Maximization of Functions [excerpt]," Numerical Recipes in C: The Art of Scientific Computing, Cambridge University Press, UK, pp. 412-420, (1993).

Redmon, J. et al., "You Only Look Once: Unified, Real-Time Object Detection," 2016 IEEE Conference on Computer Vision and Pattern Recognition (CVPR), Las Vegas, NV, pp. 779-788, (2016).

Shi, J. et al., "Good Features to Track," Proceedings of the IEEE Conference on Computer Vision and Pattern Recognition, pp. 593-600, (Jun. 1994).

Sklansky, J., "Finding the Convex Hull of a Simple Polygon," Pattern Recognition Letters, 1(2): 79-83, (1982).

Song, H. et al., "USB assembly strategy based on visual servoing and impedance control," 2015 12th International Conference on Ubiquitous Robots and Ambient Intelligence (URAI), Goyang, pp. 114-117, (2015).

Suárez-Ruiz, F. et al., "A Framework for Fine Robotic Assembly," arXiv, (2015). [<URL:https://arxiv.org/abs/1509.04806>].

Suzuki, S. et al., "Topological Structural Analysis of Digitized Binary Images by Border Following," CVGIP, 30(1):32-46, (1985).

Tipping, M.E. et al., "Mixtures of probabilistic principal component analyzers," Neural Computation, 11:443-482, (1999).

Viola, P., et al. "Rapid Object Detection using a Boosted Cascade of Simple Features," Computer Vision and Pattern Recognition (CVPR), pp. 511-518, (2001).

Viola, P., et al., "Robust real-time face detection," International Journal of Computer Vision, 57(2):137-154, (2004).

Yuen, H.K. et al., "A Comparative Study of Hough Transform Methods for Circle Finding," Image Vision Comput., 8(1):71-77, (1990).

European Application No. 20186225.7, Extended European Search Report mailed Jan. 13, 2021.

European Application No. 20186226.5, Extended European Search Report mailed Jan. 14, 2021.

(56) References Cited

OTHER PUBLICATIONS

European Application No. 23153547.7, Extended European Search Report mailed Aug. 30, 2023.

* cited by examiner

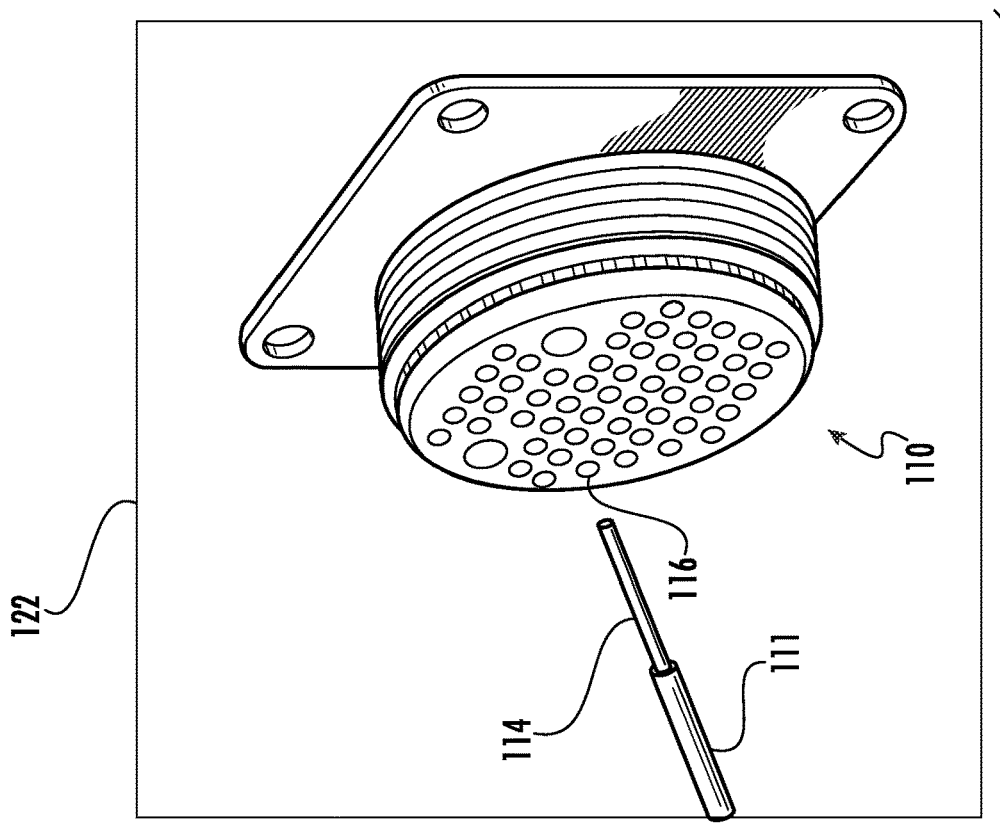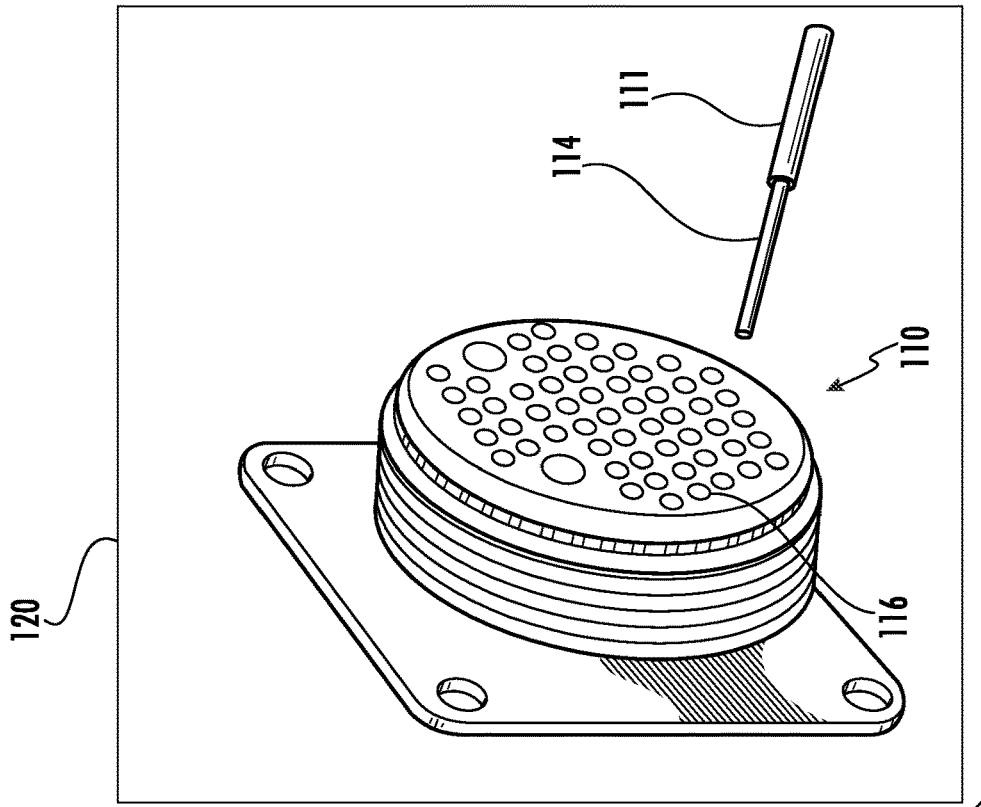
FIG. 6

$p_i$: POSITIONS OF PRIOR INSERTED WIRES
n: NUMBER OF PRIOR INSERTED WIRES
x: TARGET POSITION

IF TARGET HOLE IS ABOVE ALL $p_i$ RETURN $\alpha = 0$
$d_{max} = 0$
$\alpha_{opt} = 0$

FOR i = 1...n:
    IF $p_i$ IS ABOVE x:
        a = $p_i$ -x
        CHOOSE $\alpha$ s.th. THE CORRESPONDING LINE IS PERPENDICULAR TO VECTOR a
        IF $\alpha > \alpha_{max}$ SET $\alpha = \alpha_{max}$
        d= DISTANCE BETWEEN $p_i$ AND THE LINE DESCRIBED BY $\alpha$
        IF NO OTHER PRIOR-INSERTED WIRES (ABOVE x) ARE WITHIN DISTANCE d, SET $d_{max} = d$ AND
$\alpha_{opt} = \alpha$
    END
END

FOR i = 1...n:
    FOR j = 1+1...n:
        IF pi OR pj IS ABOVE x:
        a = $p_i$ -x
        b = $p_j$ -x
        CHOOSE $\alpha$ TO BE THE DIRECTION OF VECTOR a+b
        IF $\alpha > \alpha_{max}$ SET $\alpha = \alpha_{max}$
        d = MINIMUM DISTANCE BETWEEN EITHER $p_i$ OR $p_j$ AND THE LINE DESCRIBED BY $\alpha$
            IF NO OTHER PRIOR-INSERTED WIRES (ABOVE x) ARE WITHIN DISTANCE d, SET $d_{max} = d$
$\alpha_{opt} = \alpha$
        END
    END
END
RETURN $\alpha_{opt}$

FIG. 18

METHOD, SYSTEM, AND COMPUTER PROGRAM PRODUCT FOR WIRE CONNECTOR ASSEMBLY

TECHNICAL FIELD

A method, system and computer program product are provided in accordance with an example embodiment for wire connector assembly through wire insertion, and more particularly, to a method, system, and computer program product for alignment and insertion of a wire contact into an insertion hole of a connector in arbitrary insertion order.

BACKGROUND

Wire bundles consisting of a plurality of wires are utilized in a variety of industries to carry a myriad of different types of signals. The wire of a wire bundle assembly must frequently be terminated with a wire contact and the resulting wire end is inserted into a wire contact insertion hole of a connector, such as in a rubber grommet of a connector. As each wire of a wire bundle is unique and may carry a different type of signal, the wire ends of a wire bundle assembly must be inserted into specific wire contact insertion holes of a connector in order to make the proper connections.

The wire ends of a wire bundle assembly may be manually inserted into the respective wire contact insertion holes defined by a connector. As wire bundle assemblies commonly include dozens or possibly hundreds of wires, this manual connection process may be relatively time consuming and error prone and, as a result, may increase the cost of the overall assembly including the wire bundle assembly. As such, automated techniques to insert the wire ends of a wire bundle assembly into the wire contact insertion holes of a connector have been developed in an effort to reduce the time expended to make the connections and to correspondingly reduce the cost of the resulting assembly. However, wire bundle assembly machines generally require the connectors to be in a very restricted and controlled set of locations in order to increase the likelihood that the wire ends of the wire bundle assembly may be properly inserted into the wire contact insertion holes of the connector. As such, wire bundle assembly machines limit the flexibility with which connectors may be presented and, as such, are not suitable for all scenarios. Further, automated wire insertion techniques may improperly insert wire contacts into a connector, thereby halting the automated process and requiring correction.

BRIEF SUMMARY

A method, system and computer program product are provided for wire connector assembly through wire insertion, and more particularly, to a method, system, and computer program product for alignment and insertion of a wire contact into an insertion hole of a connector in arbitrary insertion order. Embodiments include a system for automated insertion of a wire contact into a designated wire contact insertion hole of a connector, the system including: a robot having an end-effector, where the end-effector includes a wire gripper holding the wire contact and a separator device; and a computing device, where the computing device is configured to: control the robot to position the wire gripper holding the wire contact proximate the connector; control the robot to advance the separator device past one or more wires previously connected to the connector; control the robot to align the wire contact with the designated wire contact insertion hole of the connector; control the robot to advance the wire contact toward the designated wire contact insertion hole of the connector and at least partially insert the wire contact into the designated wire contact insertion hole; control the robot to release the wire contact from the wire gripper; and control the robot to withdraw the wire gripper and the separator device from between the two or more wires previously connected to the connector.

According to some embodiments, the computing device configured to control the robot to advance the separator device past the one or more wires previously connected to the connector is further configured to: control the robot to advance the separator device from a first position relative to the wire gripper to a second position relative to the wire gripper, where the first position is further from the connector than the wire gripper, and where the second position is closer to the connector than the wire gripper; and control the robot to drive the separator device past the one or more wires in a position between the wire gripper and the connector. According to certain embodiments, the computing device configured to control the robot to advance the separator device past the one or more wires previously connected to the connector is further configured to: control the robot to move the separator device from the second position relative to the wire gripper to the first position relative to the wire gripper with the separator device engaged with the one or more wires.

According to certain embodiments, the computing device configured to control the robot to advance the wire contact toward the designated wire contact insertion hole of the connector and at least partially insert the wire contact into the designated wire contact insertion hole further includes causing the robot to: advance the wire contact toward the designated wire contact insertion hole of the connector and at least partially insert the wire contact into the designated wire contact insertion hole unobstructed by the one or more wires previously connected to the connector. The computing device of an example embodiment is further configured to: determine positions of occupied wire contact insertion holes of the connector, where occupied wire contact insertion holes are occupied with the one or more wires previously connected to the connector; and identify a path to an insertion axis of the designated wire contact insertion hole of the connector, where the path is perpendicular to the insertion axis.

According to some embodiments, the computing device configured to identify the path to the insertion axis of the designated wire contact insertion hole of the connector, where the path is perpendicular to the insertion axis, is further configured to identify the path to the insertion axis of the designated wire contact insertion hole of the connector based on a maximum distance between the path and at least one of the occupied wire contact insertion holes of the connector. The computing device configured to identify the path to the insertion axis of the designated wire contact insertion hole of the connector, where the path is perpendicular to the insertion axis, is in some embodiments, configured to: identify an angle of the path to the insertion axis of the designated wire contact insertion hole of the connector relative to a vertical axis, where the computing device configured to control the robot to position the wire gripper holding the wire contact proximate the connector is, in some embodiments, further configured to control the robot to rotate to the angle of the path relative to the connector.

According to some embodiments, the one or more wires previously connected to the connector include two or more wires previously connected to the connector, the computing device configured to control the robot to advance the separator device past the one or more wires previously connected to the connector includes the computing device configured to control the robot to advance the separator device between the two or more wires previously connected to the connector, where the separator device of an example embodiment includes a first separator element and a second separator element, where the computing device configured to control the robot to advance the separator device between the two or more wires previously connected to the connector includes, in some embodiments, the computing device configured to drive a point at which the first separator element meets the second separator element between the two or more wires previously connected to the connector along a path to an insertion axis of the designated wire contact insertion hole of the connector, where the path is perpendicular to the insertion axis.

Embodiments provided herein include a method for automated insertion of a wire contact into a designated wire contact insertion hole of a connector, the method including: controlling a robot having an end-effector to position the wire contact proximate to the connector using a wire gripper and a separator device of the end-effector; controlling the robot to advance the separator device between two or more wires previously connected to the connector; controlling the robot to align the wire contact with the designated wire contact insertion hole of the connector; controlling the robot to advance the wire contact toward the designated wire contact insertion hole of the connector and at least partially insert the wire contact into the designated wire contact insertion hole; controlling the robot to release the wire contact from the wire gripper; and controlling the robot to withdraw the wire gripper and the separator device from between the two or more wires previously connected to the connector.

According to some embodiments, controlling the robot to advance the separator device between the two or more wires previously connected to the connector includes: controlling the robot to advance the separator device from a first position relative to the wire gripper to a second position relative to the wire gripper, where the first position is further from the connector than the wire gripper, and where the second position is closer to the connector than the wire gripper; and controlling the robot to drive the separator device between the two or more wires in a position between the wire gripper and the connector. Controlling the robot to advance the separator device between the two or more wires previously connected to the connector further includes, in some embodiments, controlling the robot to move the separator device from the second position relative to the wire gripper to the first position relative to the wire gripper with the separator device engaged between the two or more wires.

According to some embodiments, controlling the robot to advance the wire contact toward the designated wire contact insertion hole of the connector and at least partially insert the wire contact into the designated wire contact insertion hole further includes advancing the wire contact toward the designated wire contact insertion hole of the connector and at least partially inserting the wire contact into the designated wire contact insertion hole between the two or more wires previously connected to the connector. The method of some embodiments further includes: determining positions of occupied wire contact insertion holes of the connector, where occupied wire contact insertion holes are occupied with the two or more wires previously connected to the connector; and identifying a path to an insertion axis of the designated wire contact insertion hole of the connector, where the path is perpendicular to the insertion axis.

According to certain embodiments, identifying the path to the insertion axis of the designated wire contact insertion hole of the connector, where the path is perpendicular to the insertion axis, further includes: identifying the path to the insertion axis of the designated wire contact insertion hole of the connector based on a maximum distance between the path and at least one of the occupied wire contact insertion holes of the connector. Identifying the path to the insertion axis of the designated wire contact insertion hole of the connector, where the path is perpendicular to the insertion axis, further includes in some embodiments: identifying an angle of the path to the insertion axis of the designated wire contact insertion hole of the connector relative to a vertical axis, where controlling the robot to position the wire gripper holding the wire contact proximate the connector further includes controlling the robot to rotate to the angle of the path relative to the connector.

According to some embodiments, the separator device includes a first separator element and a second separator element, where controlling the robot to advance the separator device between two or more wires previously connected to the connector includes driving a point at which the first separator element meets the second separator element between the two or more wires previously connected to the connector along a path to an insertion axis of the designated wire contact insertion hole of the connector, where the path is perpendicular to the insertion axis.

Embodiments provided herein include an apparatus including at least one processor and at least one memory including computer program code, the at least one memory and computer program code configured to, with the processor, cause the apparatus to at least: control a robot having an end-effector to position a wire contact proximate to the connector using a wire gripper and a separator device of the end-effector; control the robot to advance the separator device between two or more wires previously connected to the connector; control the robot to align the wire contact with the designated wire contact insertion hole of the connector; control the robot to advance the wire contact toward the designated wire contact insertion hole of the connector and at least partially insert the wire contact into the designated wire contact insertion hole; control the robot to release the wire contact from the wire gripper; and control the robot to withdraw the wire gripper and the separator device from between the two or more wires previously connected to the connector.

According to some embodiments, causing the apparatus to control the robot to advance the separator between the two or more wires previously connected to the connector includes causing the apparatus to: control the robot to advance the separator device from a first position relative to the wire gripper to a second position relative to the wire gripper, where the first position is further from the connector than the wire gripper, and where the second position is closer to the connector than the wire gripper; and control the robot to drive the separator device between the two or more wires in a position between the wire gripper and the connector. Causing the apparatus of some embodiments to control the robot to advance the separator device between the two or more wires previously connected to the connector further includes causing the apparatus to control the robot to move the separator device from the second position relative to the wire gripper to the first position relative to the wire gripper with the separator device engaged between the two or more wires. Causing the apparatus of some embodiments to control the robot to advance the wire contact toward the designated wire contact insertion hole of the connector and at least partially insert the wire contact into the designated wire contact insertion hole further includes causing the apparatus to: advance the wire contact toward the designated wire contact insertion hole of the connector and at least partially insert the wire contact into the designated wire contact insertion hole between the two or more wires previously connected to the connector.

BRIEF DESCRIPTION OF THE DRAWINGS

Figure 1:
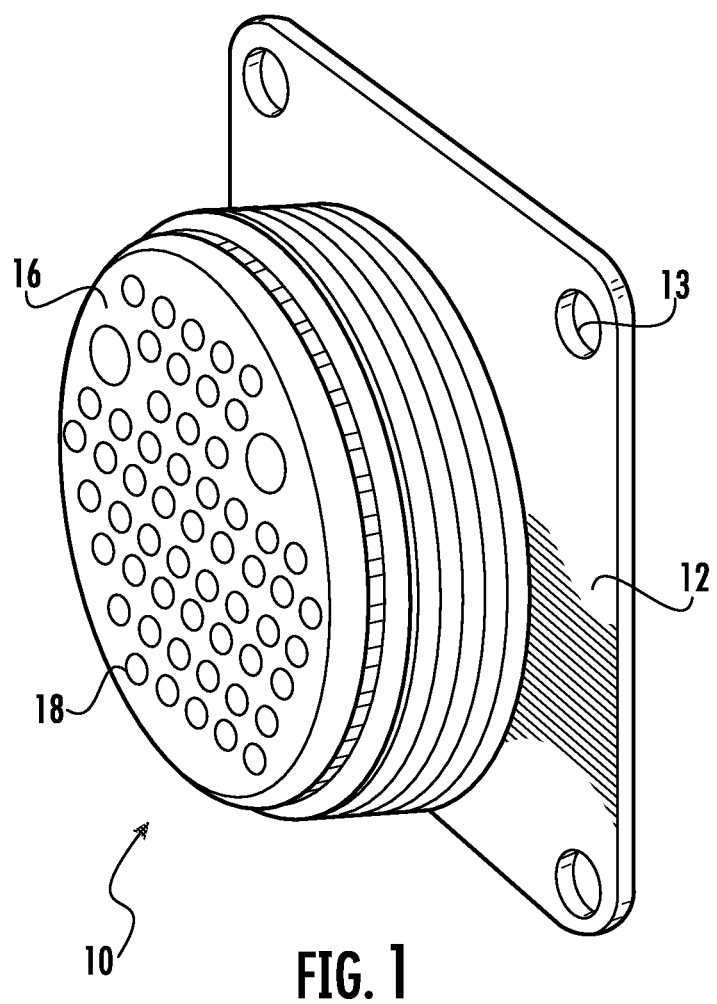
Figure 2:
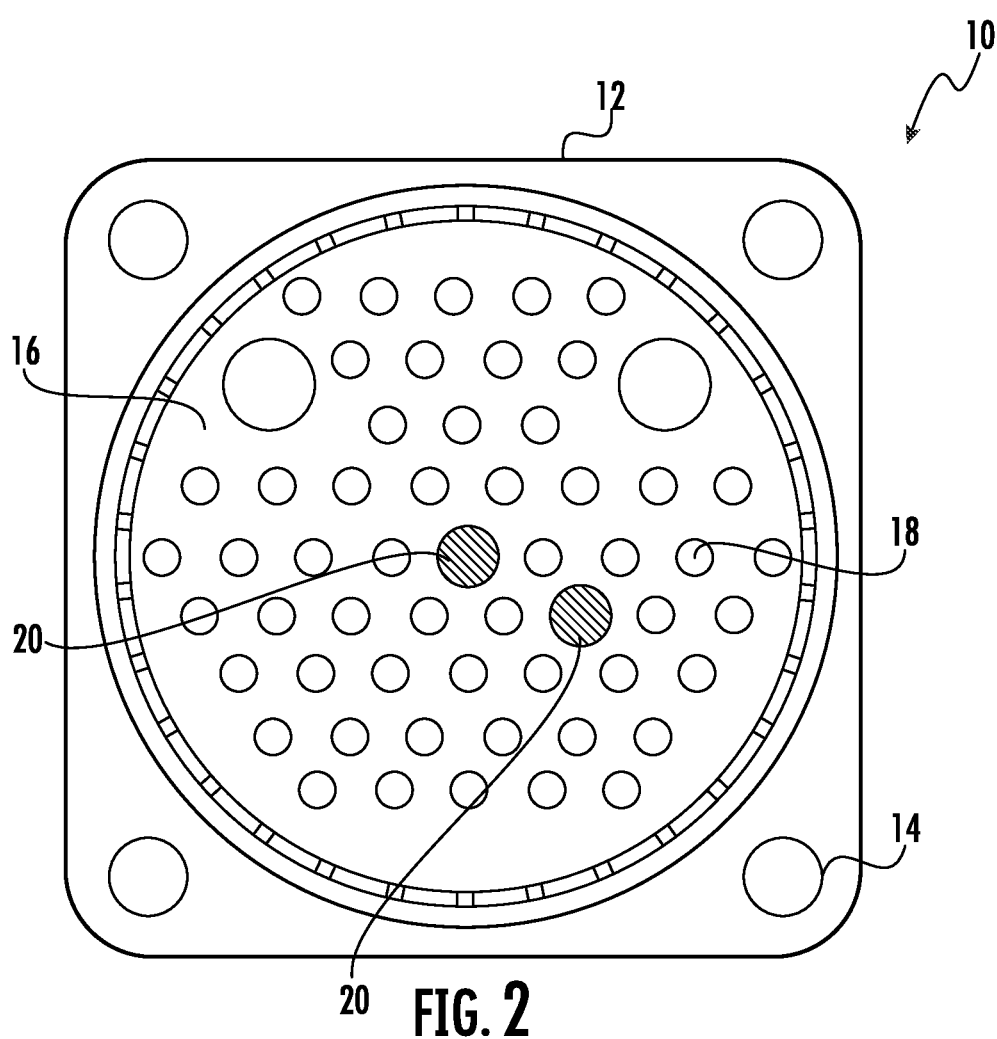
Figure 3:
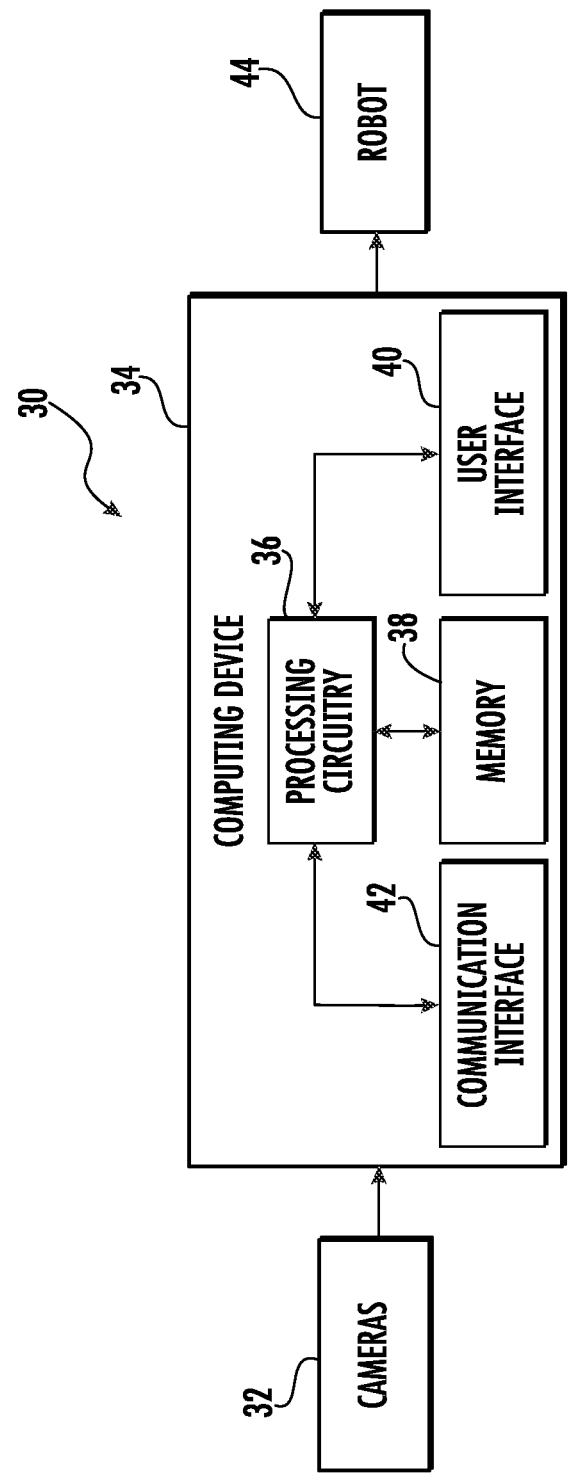
Figure 4:
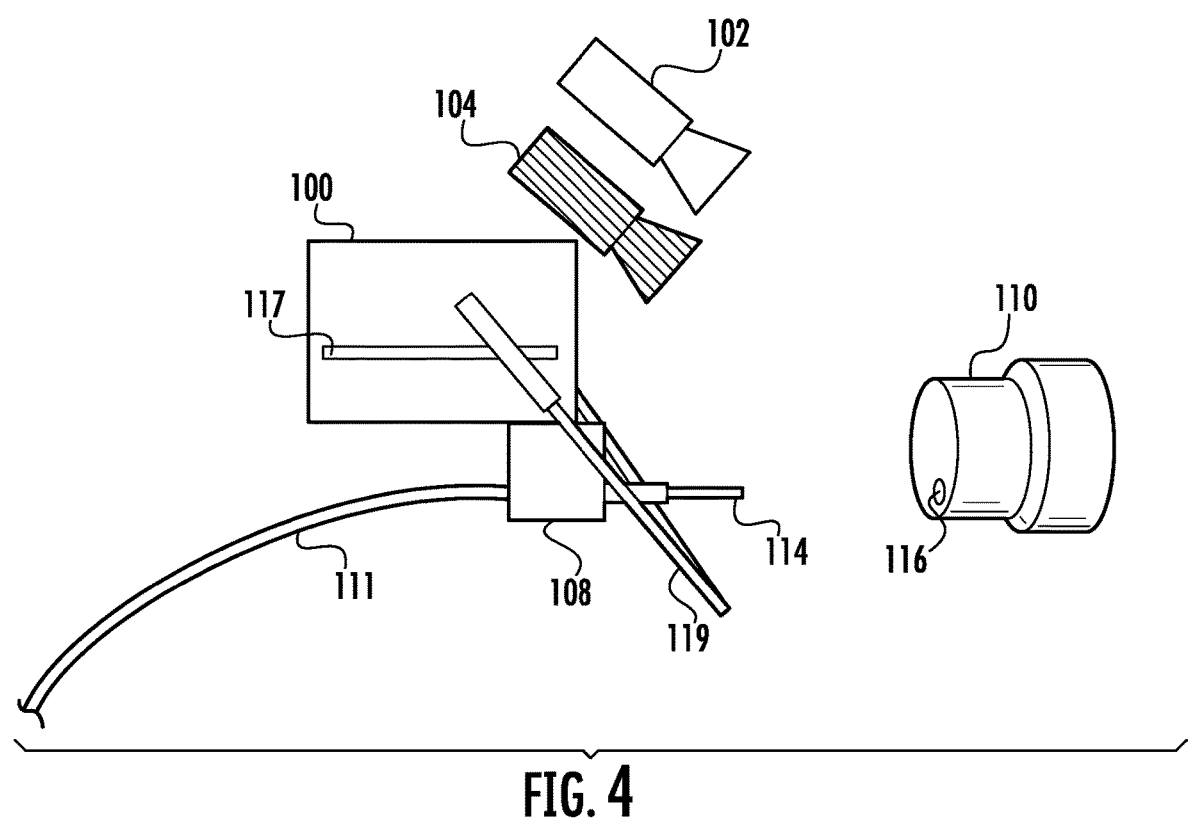
Figure 5:
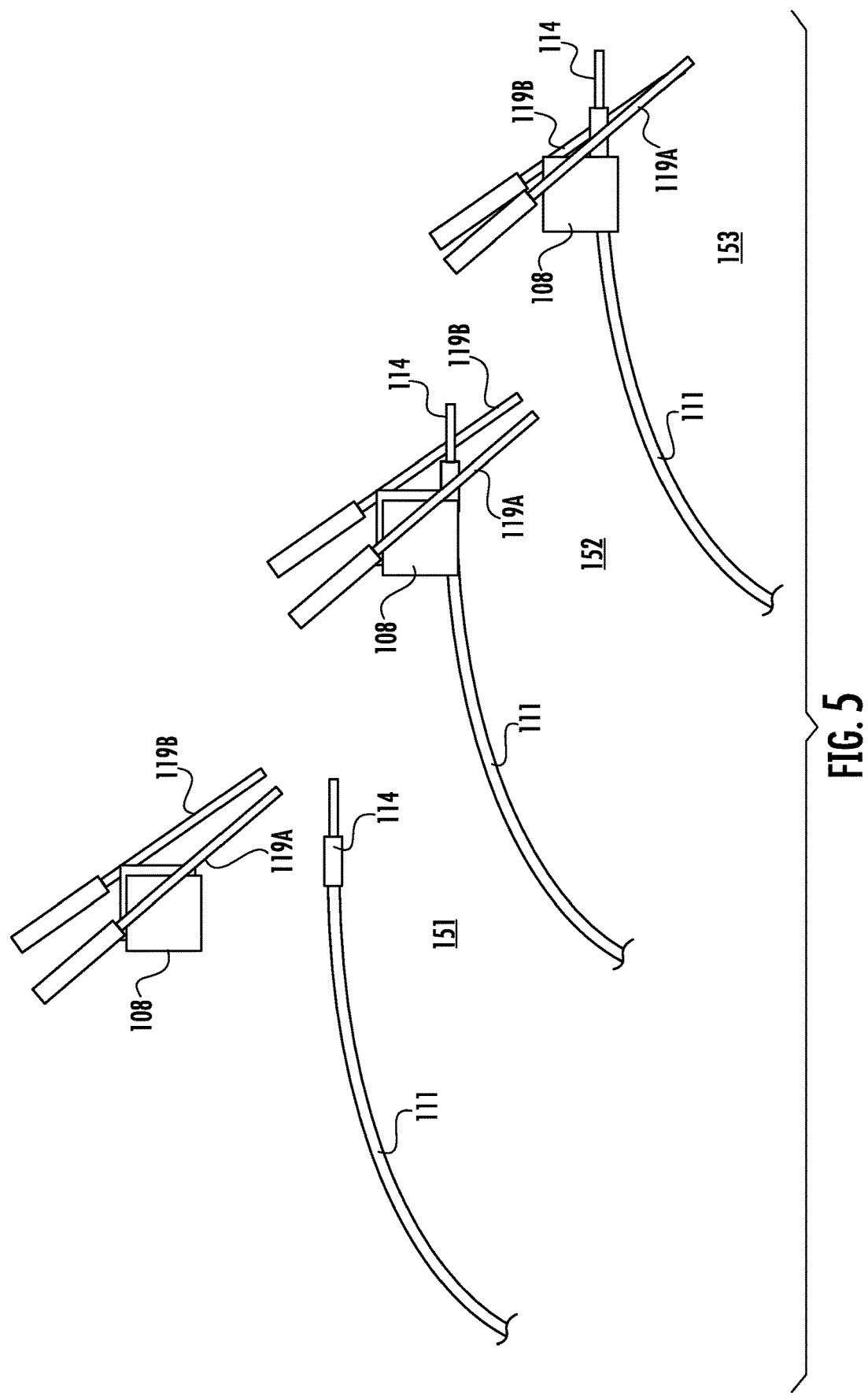
Figure 7:
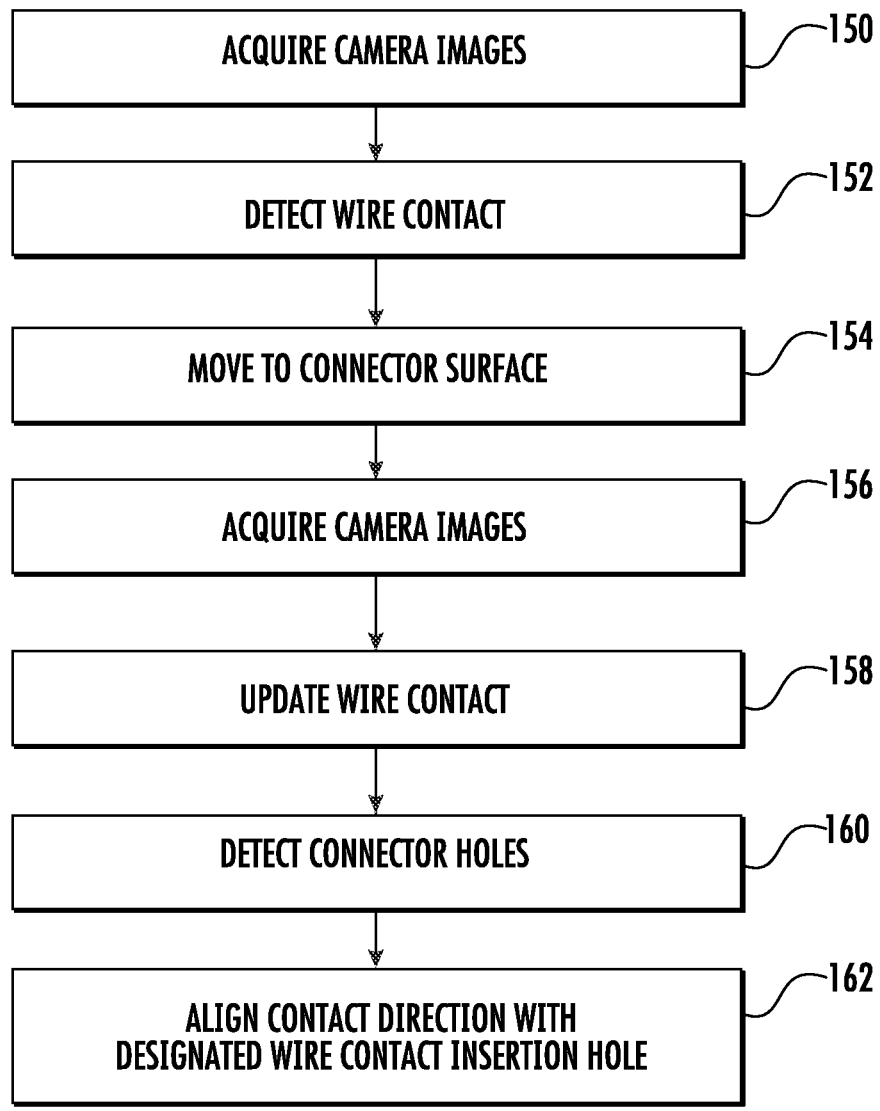
Figure 8:
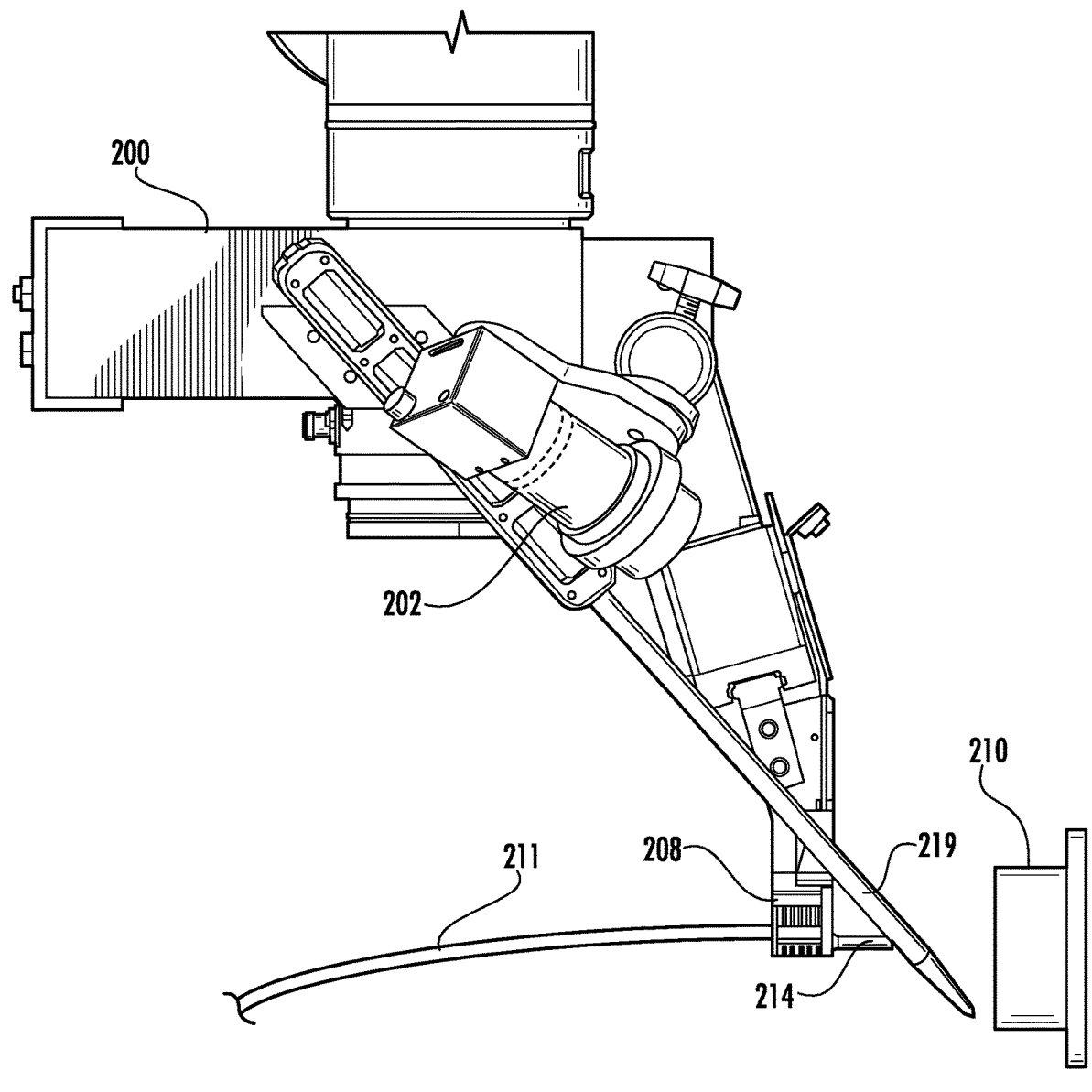
Figure 9:
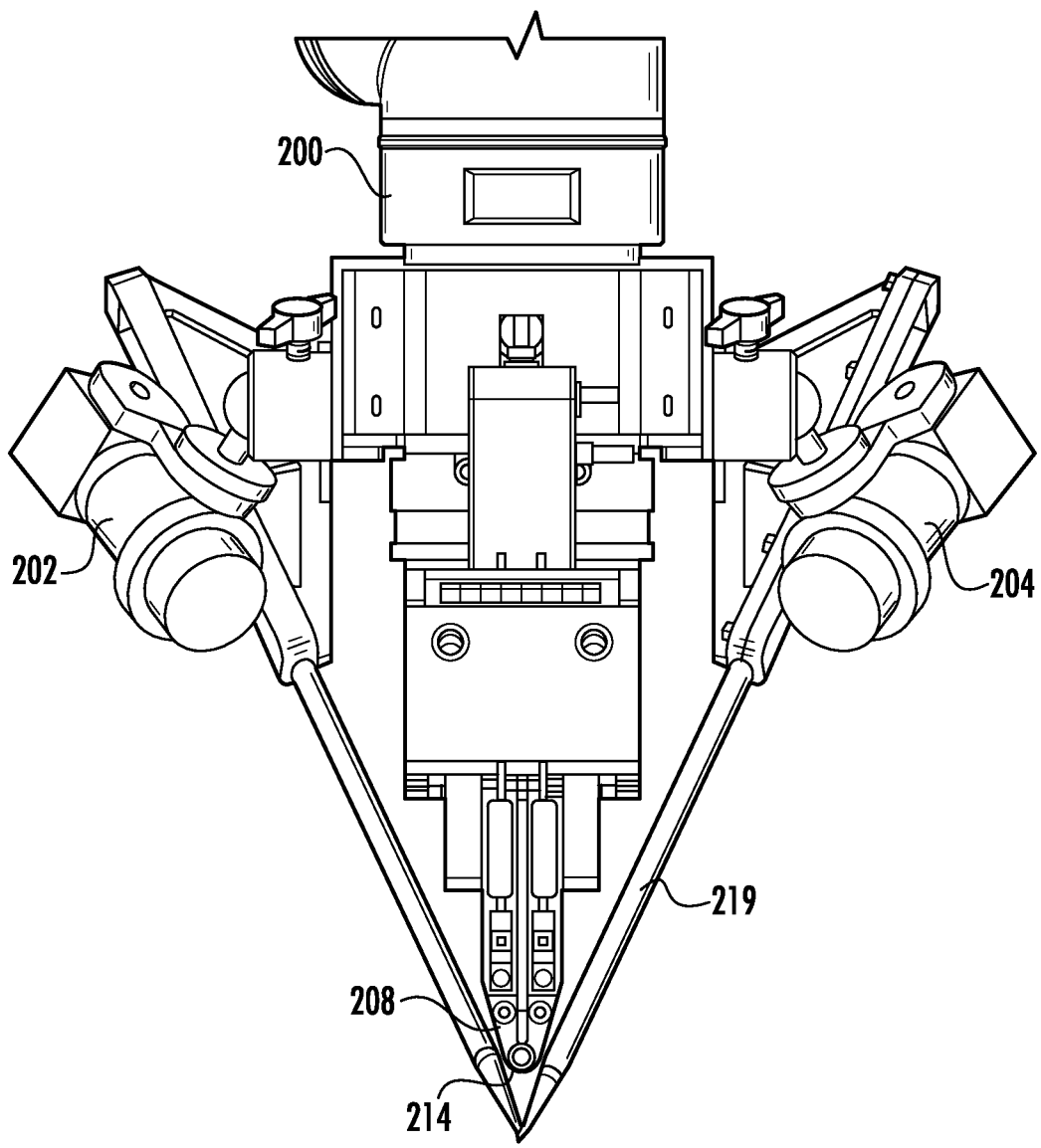
Figure 10:
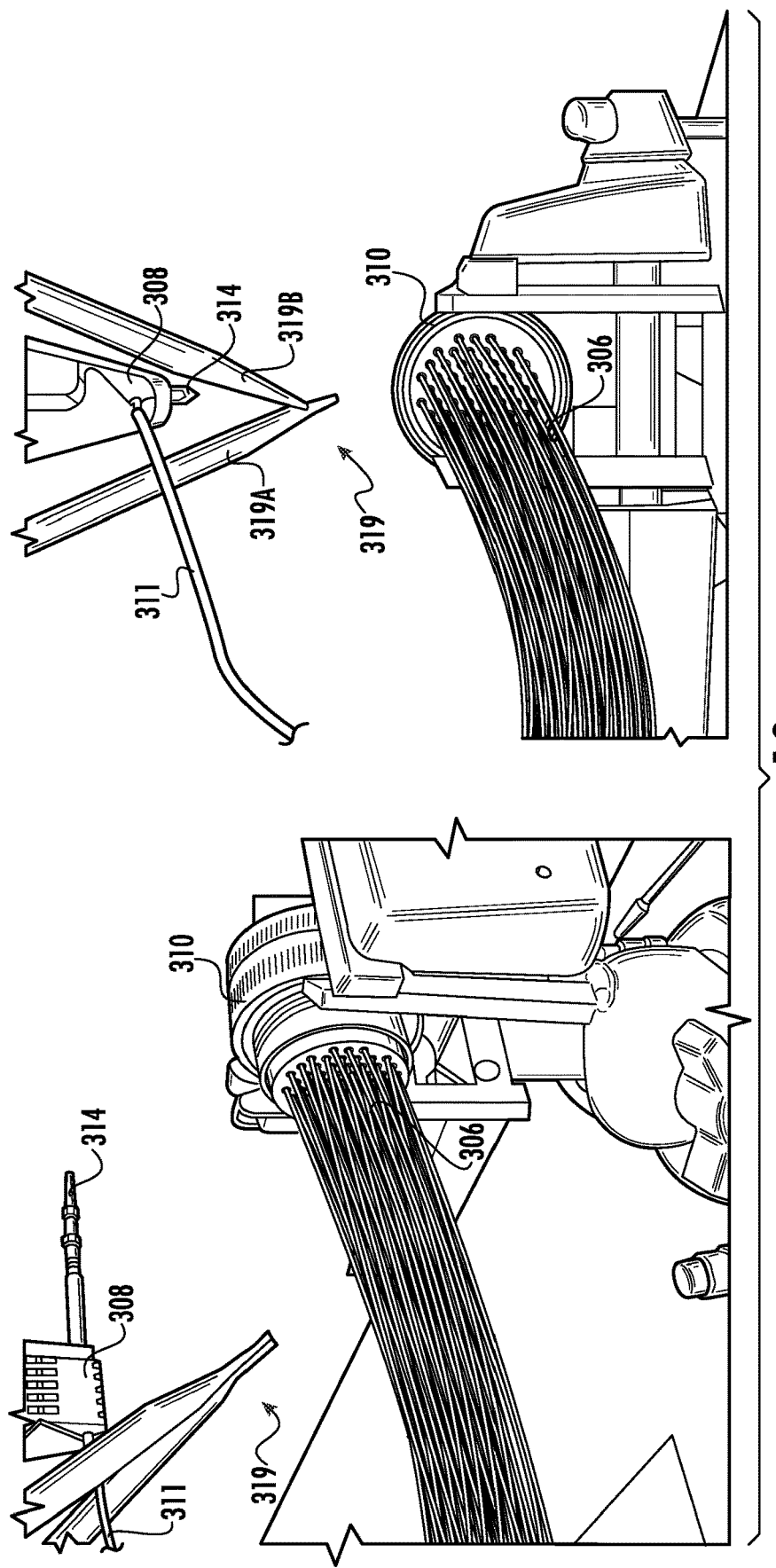
Figure 11:
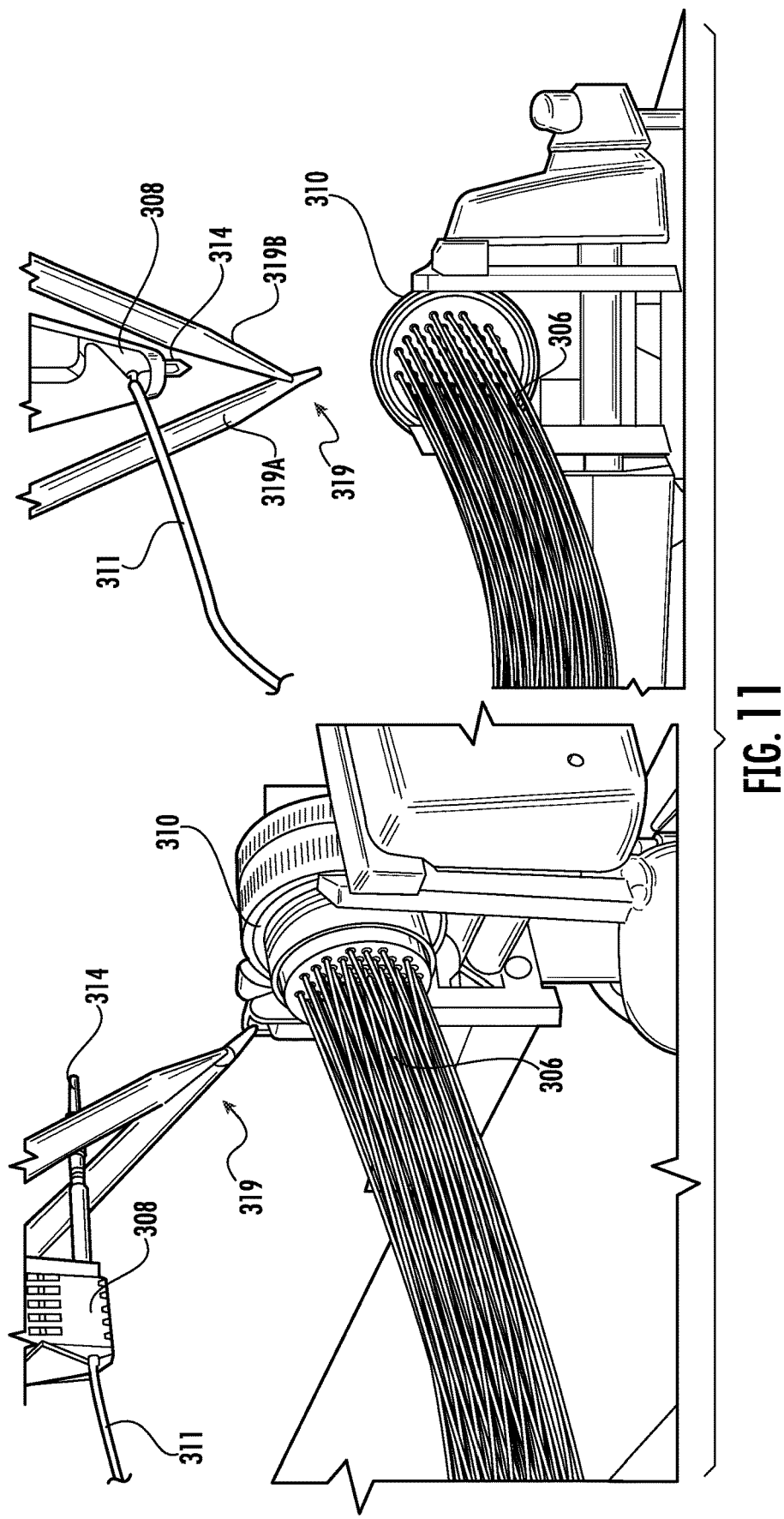
Figure 12:
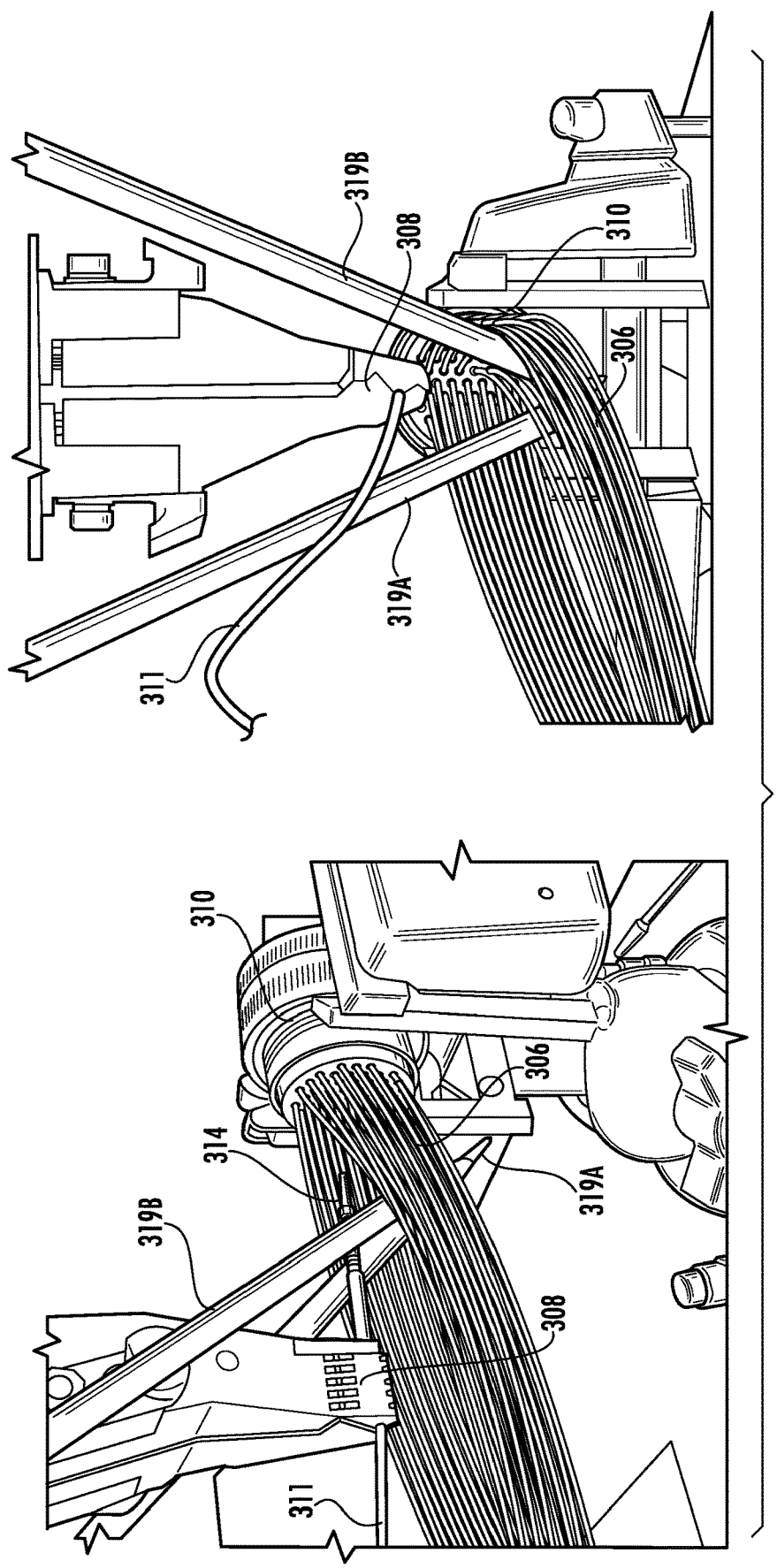
Figure 13:
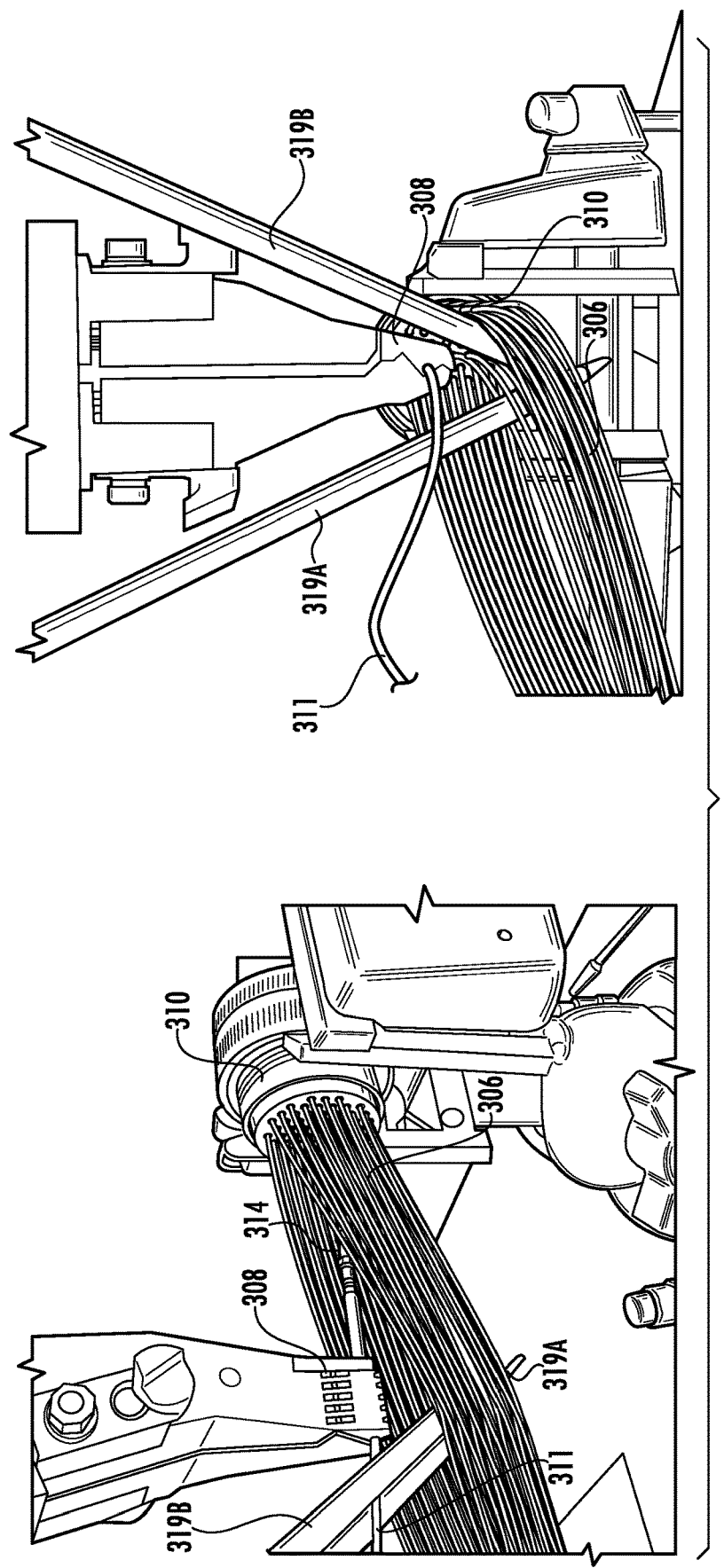
Figure 14:
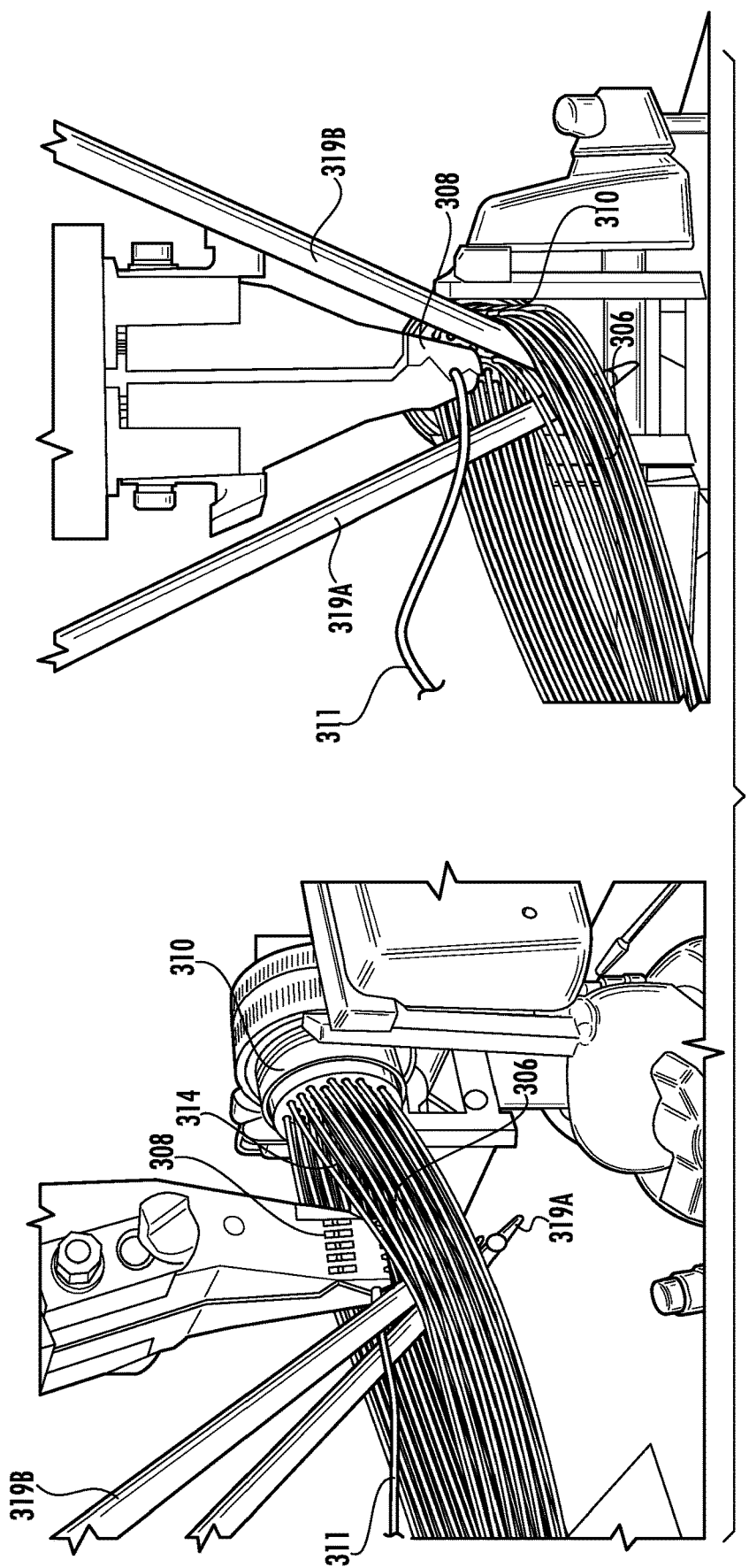
Figure 15:
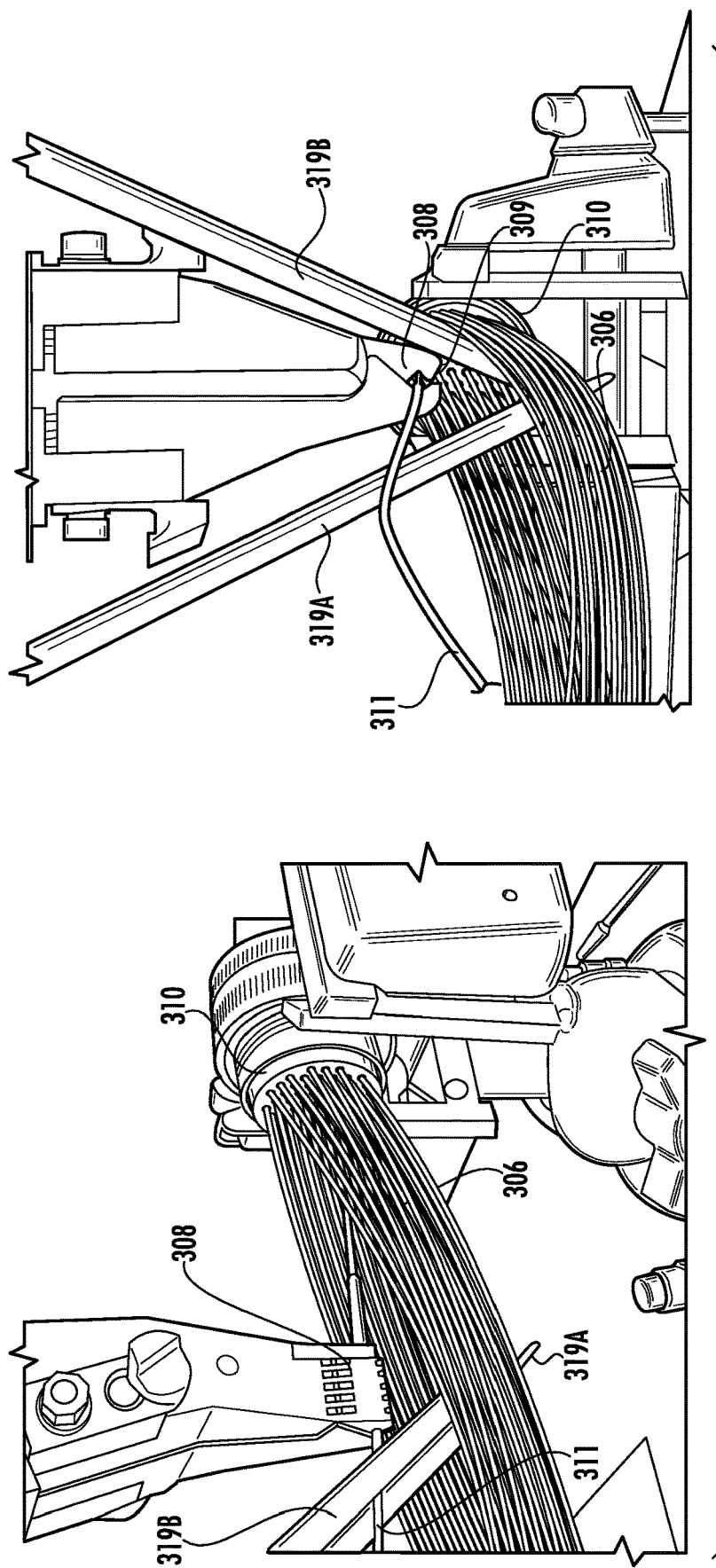
Figure 16:
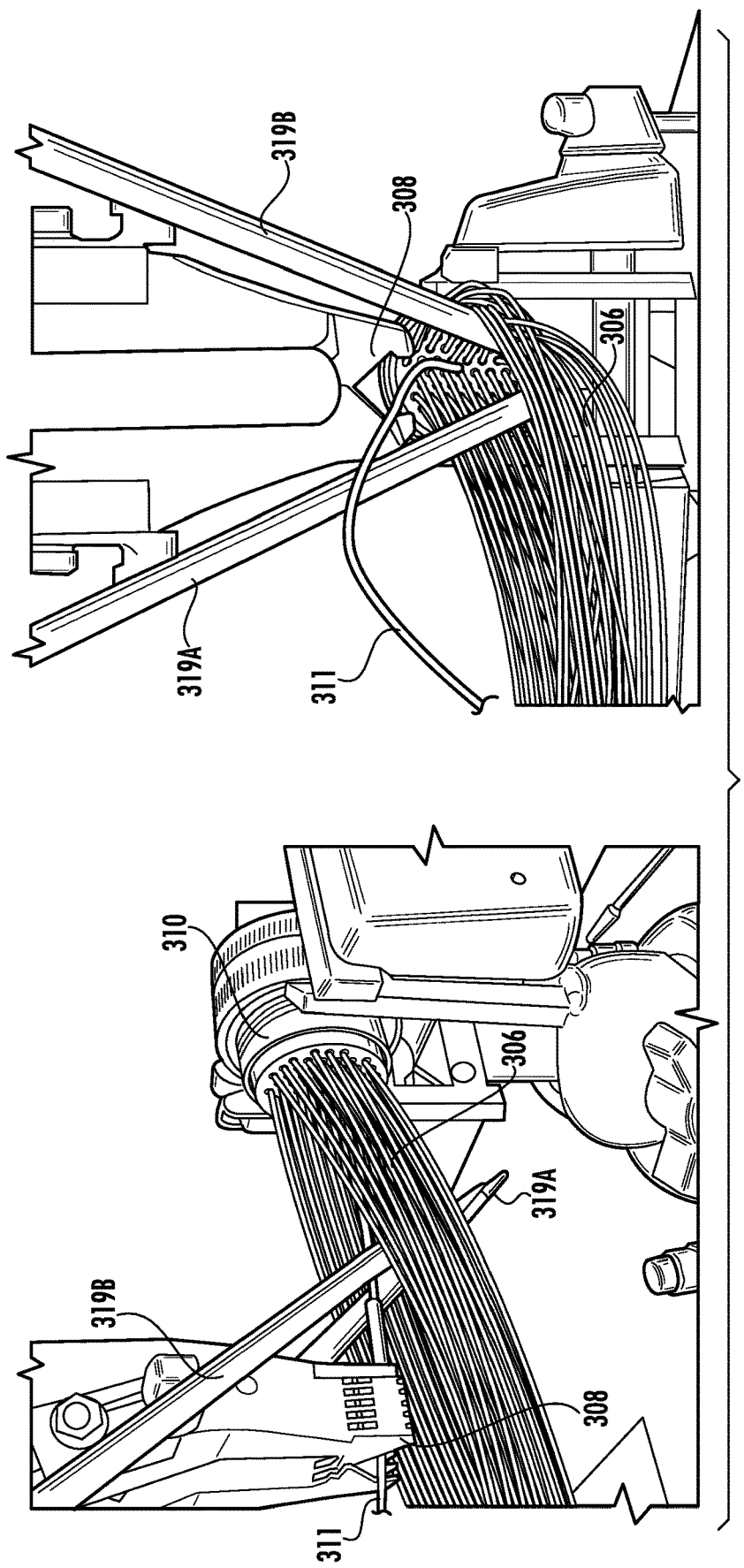
Figure 17:
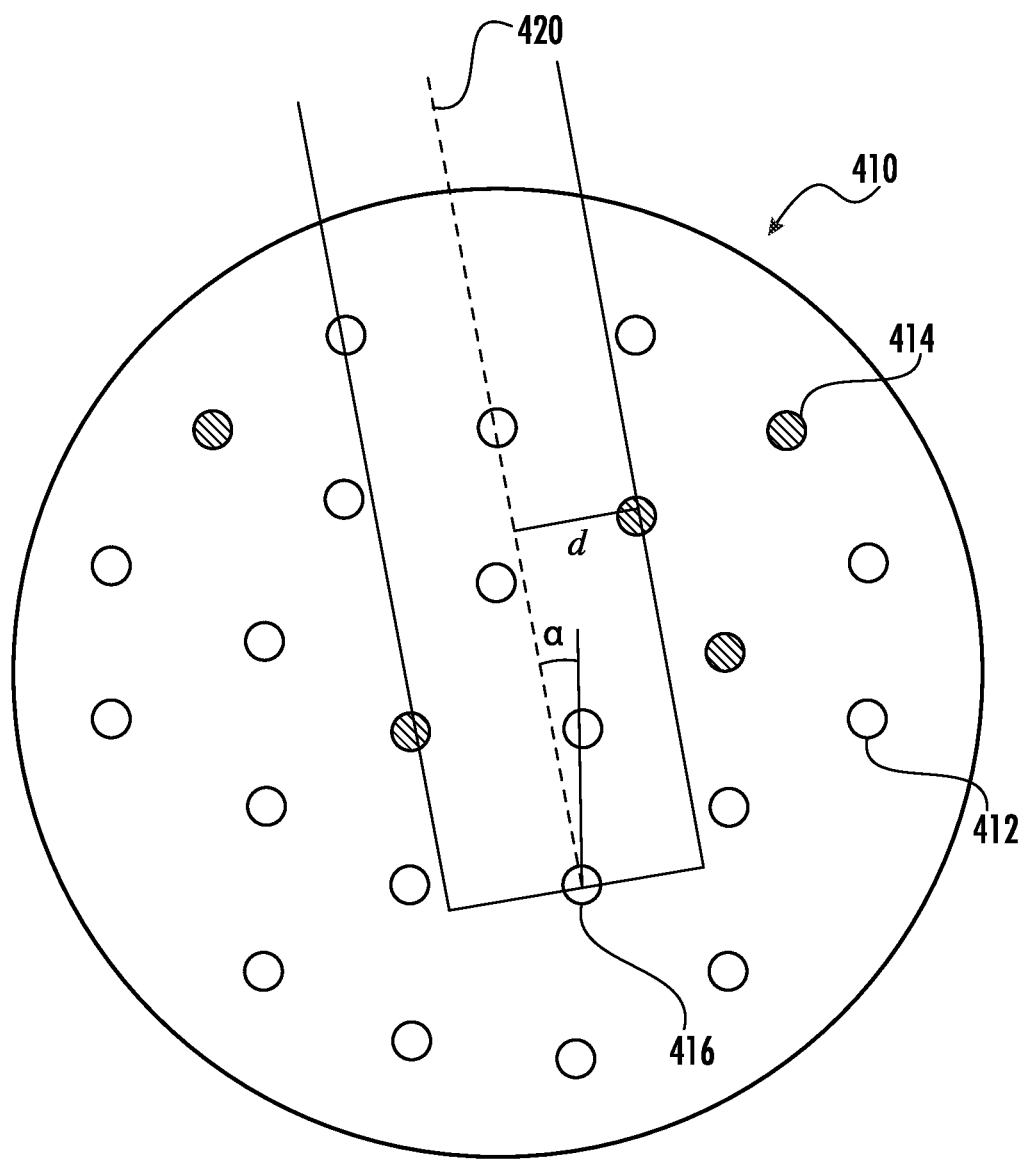
Figure 19:
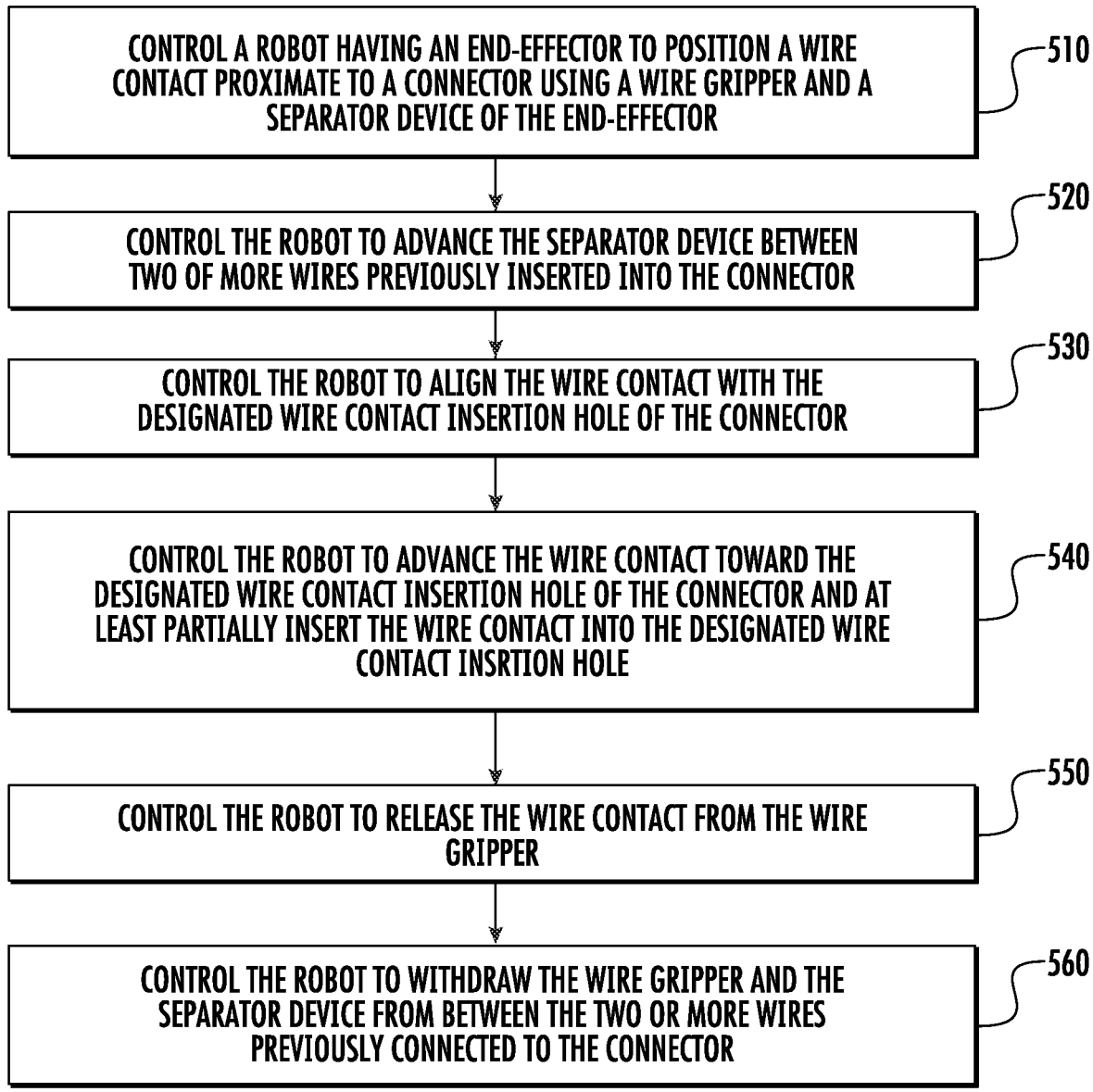

Having thus described certain example embodiments of the present disclosure in general terms, reference will hereinafter be made to the accompanying drawings which are not necessarily drawn to scale, and wherein:

FIG. 1 is a perspective view of a connector according to an example embodiment of the present disclosure;

FIG. 2 is a front view of the connector of FIG. 1 according to an example embodiment of the present disclosure;

FIG. 3 is a block diagram of the system that may be specifically configured in accordance with an example embodiment of the present disclosure;

FIG. 4 depicts a robot end-effector, wire gripper, separator device, and image acquisition devices according to an example embodiment of the present disclosure;

FIG. 5 illustrates several views of retrieving a wire having a wire contact using a wire gripper according to an example embodiment of the present disclosure;

FIG. 6 illustrates images of a connector acquired by the image acquisition devices of the robot end-effector of FIG. 4 according to an example embodiment of the present disclosure;

FIG. 7 is a flowchart of a process for aligning a wire contact with a designated wire contact insertion hole according to an example embodiment of the present disclosure;

FIG. 8 is an illustration of a robot end-effector including image acquisition devices, a wire gripper, and separator device according to an example embodiment of the present disclosure;

FIG. 9 is an illustration of another view of the robot end-effector of FIG. 8 including image acquisition devices, a wire gripper, and separator device according to an example embodiment of the present disclosure;

FIG. 10 is an illustration of two views of an operation in the process of inserting a wire contact into a designated wire contact insertion hole of a connector according to an example embodiment of the present disclosure;

FIG. 11 is an illustration of two views of another operation in the process of inserting a wire contact into a designated wire contact insertion hole of a connector according to an example embodiment of the present disclosure;

FIG. 12 is an illustration of two views of another operation in the process of inserting a wire contact into a designated wire contact insertion hole of a connector according to an example embodiment of the present disclosure;

FIG. 13 is an illustration of two views of still another operation in the process of inserting a wire contact into a designated wire contact insertion hole of a connector according to an example embodiment of the present disclosure;

FIG. 14 is an illustration of two views of another operation in the process of inserting a wire contact into a designated wire contact insertion hole of a connector according to an example embodiment of the present disclosure;

FIG. 15 is an illustration of two views of yet another operation in the process of inserting a wire contact into a designated wire contact insertion hole of a connector according to an example embodiment of the present disclosure;

FIG. 16 is an illustration of two views of another operation in the process of inserting a wire contact into a designated wire contact insertion hole of a connector according to an example embodiment of the present disclosure;

FIG. 17 is a diagram of a wire connector with previously installed wires and a path for advancing a wire contact to an insertion axis for a designated wire contact insertion hole of the connector according to an example embodiment of the present disclosure;

FIG. 18 is a depiction of pseudo code for optimizing an approach angle for advancing a wire contact to an insertion axis for a designated wire contact insertion hole of the connector according to an example embodiment of the present disclosure; and FIG. 19 is a flowchart of a method for inserting a wire contact into a designated wire contact insertion hole of a connector to which two or more wires have been previously connected according to an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A method, system, and computer program product are provided in accordance with an example embodiment described herein for automated alignment of wire contacts with insertion holes of a connector, and more particularly, to a method, system, and computer program product for alignment and insertion of a wire contact into an insertion hole of a connector in arbitrary insertion order. The process described herein detects wire contact and insertion holes simultaneously using robotic-end-effector-mounted cameras. Using simultaneous detection, embodiments of the disclosed method provide feedback for corrective movements of a robot arm used to insert the wire contacts into the insertion holes of the connector. The movements of the robot arm align the wire contact with a designated wire contact insertion hole for successful insertion into an appropriate hole of a connector. However, wire connectors often include a plurality of wires inserted into the connector, such that wire contacts installed into the connector after several wire contacts are already inserted may face additional challenges due to the wire leads extending from the connector and obstructing both a view and insertion line for the insertion of a wire contact into an insertion hole of a connector. Embodiments described herein overcome challenges of inserting a wire contact into an insertion hole of a connector when a plurality of wire contacts are already inserted into other insertion holes of the connector.

The assembly of wire bundles including the attachment of one or more wire connectors to the wire bundle has traditionally been a labor-intensive process that is both time consuming and introduces opportunities for errors in the assembly. Embodiments described herein enable the automatic assembly of wire bundles and their associated wire connectors in a manner that does not require a specific order of insertion. Embodiments provide a process for robotically retrieving and inserting wire contacts into connectors, particularly allowing insertions in an arbitrary insertion hole order. Embodiments include a separating mechanism to split wires from previously inserted wire contacts, while cameras proximate a gripper grasping the wire provide contact hole alignment. Images from the cameras are processed to control alignment and insertion of a wire contact into the connector. Embodiments provide for the automatic insertion of wire ends and the respective wire contacts thereof into connectors without necessitating a specific insertion order. Embodiments described herein may use a robot arm with a robot end effector to insert the wires, supporting a flexible layout of connectors and wires.

A method, system and computer program product are provided in accordance with an example embodiment in order to provide a clear path for a wire contact to be inserted into an insertion hole of a connector. Embodiments use a separating mechanism to separate wires previously inserted into the connector proximate the connector such that cameras can identify wire contacts and wire contact insertion holes defined by a connector to align and insert the wire contacts into the wire contact insertion holes. Although the method, system and computer program product may be configured to identify the wire contacts and wire contact insertion holes of a variety of different types of connectors, the connectors generally define a plurality of wire contact insertion holes or connector holes within a housing with the wire contact insertion holes being arranged in a predefined configuration. Different connectors may include different numbers of wire contact insertion holes and may include wire contact insertion holes arranged in different configurations.

One example of a connector is depicted in FIGS. 1 and 2 in the form of a connector 10. As shown, the connector 10 includes a housing 12 and a rubber grommet 16 disposed therein. Although the housing 12 may be configured differently for other types of connectors, the housing of the connector 10 of the embodiment of FIGS. 1 and 2 is externally threaded to facilitate, for example, the secure threaded engagement of a wire bundle assembly or another connector therewith. The connector 10 of FIGS. 1 and 2 also includes a radially extending flange defining a plurality of openings 13, such as for receiving screws or other fasteners for mounting the connector to an assembly. Although the connector 10 of FIG. 1 has a cylindrical shape, the connector of other example embodiments may have different sizes and shapes. In regards to the example connector of FIGS. 1 and 2, a rubber grommet 16 is disposed within the housing and the rubber grommet defines a plurality of wire contact insertion holes 18. The wire contact insertion holes 18 defined by the rubber grommet 16 are configured, e.g., sized, and shaped, such that a wire end consisting of a wire contact connected, e.g., crimped, to the end of a wire, is inserted into and mechanically retained within the wire contact insertion hole 18.

As shown by the example of the connector 10 of FIGS. 1 and 2, the plurality of wire contact insertion holes 18 defined by the rubber grommet 16, are arranged in a predefined pattern. In some embodiments, not all of the wire contact insertion holes of a connector 10 will be utilized and, instead, only a subset of the wire contact insertion holes will receive and make electrical connection with corresponding wire ends of the wire bundle assembly. As illustrated in FIG. 2, the wire contact insertion holes 18 defined by the rubber grommet 16 that are not to be utilized in conjunction with a particular application may be eliminated from further consideration by the insertion a plug 20 into the respective wire contact insertion hole defined by the rubber grommet. Although a connector 10 that may be analyzed in accordance with an example embodiment of the present disclosure is depicted in FIGS. 1 and 2 and will be described hereinafter, the method, system and computer program product of an example embodiment may be utilized in conjunction with a wide variety of other connectors and the connector is illustrated and described by way of example, but not of limitation.

The plugs 20 of a wire connector may be used to fill holes that may not be used for the wire bundle being assembled. For example, a connector may have twenty wire contact insertion holes 18; however, a wire bundle feeding the connector 10 may include only eighteen wires and corresponding wire contacts. In such an embodiment, the unused wire contact insertion holes may be plugged with plugs 20 such that there is less or possibly no opportunity for water, moisture, or other corrosive/oxidizing substance to enter the connector and contaminate the wires and wire contacts.

As evident from the connector 10 of FIGS. 1 and 2, connectors can include a plurality of wire contact insertion holes 18 into which wire contacts are received. As wire contacts of respective wires are inserted, the connector becomes crowded with a pigtail of wires that is particularly dense proximate the connector. This renders the continued insertion of wire contacts into remaining, available insertion holes of the connector difficult, particularly when computer vision is used to identify available insertion holes for alignment. Embodiments provided herein facilitate wire contact insertion in arbitrary order. This capability improves robotic alignment and insertion of wire contacts into connector insertion holes.

Referring now to FIG. 3, a system for parting wires having contacts previously inserted into a connector, identifying wire contact insertion holes 18 of the connector 10, and inserting wire contacts into corresponding available wire contact insertion holes 18 is depicted. As shown, the system 30 includes cameras 32 configured the acquire images of the connector 10. While plural cameras are indicated in FIG. 3, embodiments may employ a single camera, or may employ a single camera operating with mirrors to provide various perspectives of the connector 10 using a single camera. The cameras described herein are a type of image acquisition device, where a variety of image acquisition device types may be used in place of a camera. Image acquisition devices, generally, acquire an image of the field of view of the device. A camera, as described herein, acquires an image of the field of view in the visible light spectrum and processes the image accordingly. The cameras 32 may be configured to acquire a gray scale image of the connector 10. Alternatively, the cameras 32 may be configured to acquire color images of the connector 10. In an embodiment in which color images of the connector 10 are acquired, the image associated with each different color channel of the cameras 32, such as the red, green, and blue color channels, may be averaged to create a composite image for subsequent analysis and review. Alternatively, the different color channels of the cameras 32 may be separately analyzed. The cameras 32 are generally configured to acquire images of the front face of the connector 10, such as shown in FIG. 2, such that the plurality of wire contact insertion holes 18 defined by the rubber grommet 16 are clearly visible. The cameras 32 may also be configured to acquire images of the wire contacts during alignment of the wire contacts with the connector 10. As such, the image acquired by the cameras 32 of an example embodiment may be acquired at a plurality of angles to provide different perspectives of the connector 10 and wire contacts.

In addition to the cameras 32, the system 30 of FIG. 3 includes a computing device 34 configured to analyze the images of the connector 10 acquired by the cameras and to identify wire contact insertion holes of the connector and wire contacts. The system 30 may also be configured to identify plugs 20 within a connector 10. As also shown in FIG. 3, the system 30 of an example embodiment also includes or is in communication with a robot 44 and, more particularly, a robotic end effector that is utilized to insert wire ends/contacts into respective candidate contact insertion holes of the connector 10 based upon the identification of the wire contact insertion holes of the connector and the wire contacts by the computing device 34.

While identification of wire contact insertion holes in the connector is generally less complex when a connector does not have any wires inserted into the connector, embodiments described herein enable the system of FIG. 3 to move wires that are inserted into the connector to provide visibility to available wire contact insertion holes of the connector. In this manner, insertion holes that are obscured by wires inserted into the connector can be made visible by separating wires around the available wire contact insertion hole to provide the cameras 32 visibility of the available wire contact insertion hole for alignment and insertion of a wire contact.

The computing device 34 may be configured in various manners and, as such, may be embodied as a personal computer, a tablet computer, a computer workstation, a mobile computing device such as a smartphone, a server, or the like. Regardless of the manner in which the computing device 34 is embodied, the computing device of an example embodiment includes or is otherwise associated with processing circuitry 36, memory 38, and optionally a user interface 40 and a communication interface 42 for performing the various functions herein described. The processing circuitry 36 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 36 is configured to execute instructions stored in the memory 38 or otherwise accessible to the processing circuitry. These instructions, when executed by the processing circuitry 36, may cause the computing device 34 and, in turn, the system 30 to perform one or more of the functionalities described herein. As such, the computing device 34 may comprise an entity capable of performing operations according to an example embodiment of the present disclosure while configured accordingly. Thus, for example, when the processing circuitry 36 is embodied as an ASIC, FPGA or the like, the processing circuitry and, correspondingly, the computing device 34 may comprise specifically configured hardware for conducting one or more operations described herein. Alternatively, as another example, when the processing circuitry 36 is embodied as an executor of instructions, such as may be stored in the memory 38 the instructions may specifically configure the processing circuitry and, in turn, the computing device 34 to perform one or more algorithms and operations described herein.

The memory 38 may include, for example, volatile and/or non-volatile memory. The memory 38 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 38 may comprise any non-transitory computer readable storage medium. The memory 38 may be configured to store information, data, applications, instructions, or the like for enabling the computing device 34 to carry out various functions in accordance with example embodiments of the present disclosure. For example, the memory 38 may be configured to store program instructions for execution by the processing circuitry 36.

The user interface 40 may be in communication with the processing circuitry 36 and the memory 38 to receive user input and/or to provide an audible, visual, mechanical, or other output to a user. As such, the user interface 40 may include, for example, a display for providing an image acquired by the camera 32 and/or an image visually depicting the closest match between the candidate contacts and a predetermined template as described below. Other examples of the user interface 40 include a keyboard, a mouse, a joystick, a microphone and/or other input/output mechanisms.

The communication interface 42 may be in communication with the processing circuitry 36 and the memory 38 and may be configured to receive and/or transmit data, such as by receiving images from the camera 32 and transmitting information, such as a list of candidate contact insertion holes, contact ID numbers and locations of the candidate contact insertion holes in a connector-based coordinate system, to a robot 44 and/or a robotic end-effector. Although referenced herein as candidate contact insertion holes, contact ID numbers and locations of the candidate contact insertion holes, the list of candidate contact insertion holes, contact ID numbers and locations of the candidate contact insertion holes is to be interpreted so as to be associated with the candidate contact insertion holes themselves and/or wire contacts aligned with the respective candidate contact insertion holes in those embodiments that include such wire contacts. The communication interface 42 may include, for example, one or more antennas and supporting hardware and/or software for enabling communications with a wireless communication network. Additionally or alternatively, the communication interface 42 may include the circuitry for interacting with the antenna(s) to cause transmission of signals via the antenna(s) or to handle receipt of signals received via the antenna(s). In some environments, the communication interface 42 may alternatively or also support wired communication.

Referring now to FIG. 4, an example embodiment of a system performing the methods described herein is shown including a robot end-effector 100, which may include a tool head having three or more degrees of freedom, and image acquisition devices including a first camera 102 and a second camera 104. The robotic end-effector 100 may carry a wire 111 in a wire gripper 108 including a wire contact 114 at the leading end of the wire 111. The robot end-effector of example embodiments further includes separator device 119 A connector 110 is disposed in a fixed location as it is approached by the robotic end-effector 100. The connector is illustrated with a single designated wire contact insertion hole 116; however, the single designated wire contact insertion hole is shown for ease of understanding as connectors will include a plurality of designated wire contact insertion holes, and in some cases, a plurality of previously-inserted wires. The two cameras 102, 104 are mounted on the robotic end-effector 100 in such a way as to view both the wire 111 including the wire contact and the connector 110 simultaneously.

While the embodiment of FIG. 4 includes two cameras, embodiments may include more cameras. Further, a single camera may be used in conjunction with mirrors to observe different perspectives of the wire contact and the connector using the single camera. Capturing multiple perspectives, such as using two or more cameras, may enable accurate positioning of the wire contact and the connector as they are joined. In an example embodiment, four cameras are attached to the robot end-effector with a first pair of cameras positioned above the wire gripper looking down on to the wire gripper and a wire contact captured therein. The first pair of cameras positioned such that a surface of a connector is within the field of view when the wire contact is brought toward the connector. A second pair of cameras may be mounted near the gripper tip to obtain an unobstructed view of the designated wire contact insertion hole prior to insertion. Camera images may rely on sufficient lighting to obtain the highest quality images and to provide the most accurate alignment. As such, lights, such as LED lights, may be affixed to the robot end-effector for consistent lighting for the camera images.

The separator device 119 of the illustrated embodiment is movable toward and away from a connector 110, such as along a rail 117 and movement may be imparted, for example, by a pneumatic or hydraulic cylinder along the rail or by a servo motor, for example. In an example in which the separator device 119 is movable using a pneumatic cylinder, the pneumatic cylinder may be controlled by a solenoid which is turned on and off by the control software for automated picking of the wire and insertion of the wire contact into the designated wire contact insertion hole.

Embodiments described herein are configured to assemble a wire connector by picking and inserting wires with attached wire contacts into wire contact insertion holes of a connector. To that end, wires must first be obtained and grasped by the wire gripper 108 before alignment and insertion into a connector. An example process for retrieving wires may include where wires with contacts attached thereto are parked, such as in a wire holder. The robot end-effector 100 can be moved to position the wire gripper 108 above the parked wire. The separator device 119 and the wire gripper 108 can each be opened such that the end-effector can move the separator device 119 past the wire (between a first separator element 119A and second separator element 119B, described and illustrated further below) and the wire can be positioned between grasping elements of the wire gripper 108.

FIG. 5 illustrates a schematic of a movement sequence to grasp a parked wire. The wire gripper 108 and separator device 119 are depicted separate from the remaining components of the robot end-effector for ease of understanding. As shown at 151, the wire gripper 108 and the separator device including the first separator element 119A and second separator element 119B are moved to a predetermined location near a wire holder (not shown) holding the wire 111 in a stationary position. The initial position may include an orientation in which the first separator element 119A and the second separator element 119B are in contact with one another below the wire gripper 108. In such a scenario, the first separator element 119A and second separator element 119B may be moved apart from one another as the grasping elements of the wire gripper 108 are moved apart as shown at 151, in a position ready to receive a wire 111. In the wire gripper 108 position shown at 151 in FIG. 5, images may be captured, such as from cameras 102 and 104 of FIG. 4. A controller processes the images and computes machine commands to move the robot end-effector 100. The captured images include the wire 111 and the wire contact 114 and the grasping elements of the wire gripper 108. The controller can use these images, captured from different orientations, to estimate the position of the wire 111 relative to the wire gripper 108. Given this estimated position, the robot end-effector is commanded by the controller to move in order to translate the wire gripper 108 such that the wire 111 is between the grasping elements of the wire gripper. These commands can be executed in a control loop, where images are captured, the wire location is estimated, and movement commands are executed until the position of the wire is between the grasping elements of the wire gripper within a threshold distance (e.g., one millimeter).

Once the wire gripper 108 is aligned with the wire 111, as shown at 152 of FIG. 5, the wire gripper 108 closes the grasping elements to hold the wire as shown at 153. The wire gripper 108 may push down onto the wire 111 to cause the wire 111 to be released from a wire holder. The wire gripper 108 is configured to grasp the wire 111 just behind the wire contact 114 to facilitate insertion of the wire contact 114 into a designated wire contact insertion hole of the connector. The wire gripper 108 of an example embodiment is configured to grasp the wire and vary between a secure grasp of the wire and a cradling, looser grasp of the wire, where in the looser grasp of the wire, the wire gripper 108 can be moved along a length of the wire to the appropriate position near the wire contact 114. The sliding of the wire gripper 108 along the wire to the appropriate position can be performed in a closed-loop control using images captured by the cameras to determine a distance between the wire gripper 108 and the wire contact 114. Once the wire is grasped by the wire gripper 108 proximate the wire contact 114, the robot end-effector moves the grasped wire to a position for alignment and insertion of the wire contact into the designated wire contact insertion hole of the connector.

While the operation of the separator device 119 is described further below, the alignment process of the wire contact 114 with the designated wire contact insertion hole of the connector 110 is described herein without regard for visual obstructions that may be present when a plurality of wires are already connected to the connector. According to example embodiments described herein, images are acquired of the wire 111 and wire contact 114 along with the connector 110 from more than one perspective. Using the different perspectives, a line is identified that extends in the direction of the wire and wire contact and a hole in the connector that is the target hole for the wire is identified. FIG. 6 illustrates images 120, 122 acquired by two different image acquisition devices, such as the cameras 102 and 104 of FIG. 4 of the wire 111 including wire contact 114 and the connector 110, specifically the identified designated wire contact insertion hole 116 of the connector into which the wire 111 is to be inserted. A line, identified through multiple perspectives, provides at least a stereoscopic indication of the relationship between the wire contact and the target hole of the connector into which the wire is to be inserted, and may be identified based on the axial projection of the wire 111 and wire contact 114. Based on the identified line from the images, a movement command may be computed that would place the hole on the line in at least two images. This may initially establish a rotation of the end-effector to bring the tip of the wire gripper 108 perpendicular to the connector surface. To place the hole on the line, a movement is established in parallel to the connector surface to align the line with the appropriate target hole of the connector. A movement command is the desired displacement of the robot end-effector in three-dimensional cartesian space. Aligning the wire contact with the hole places the wire in a proper position to enable the robot to move the wire along the line toward the appropriate hole of the connector for insertion.

Embodiments described herein may calibrate the cameras ahead of using them to align the wire with the target hole of the connector. The purpose of the calibration is to compute a mapping of three dimensional Cartesian coordinates onto a two dimensional image coordinates. The calibration may be carried out before wires are fed to the robotic wire gripper of the end-effector. Calibration is not necessary before every wire insertion or before every connector change, but may be necessary when camera settings change, such as the focus, zoom, orientation, etc.

Embodiments use image analysis to identify wire contact insertion holes in a connector, and to align a wire contact with a designated wire contact insertion hole. For each camera image analyzed, a line describing the wire contact and a location of the target hole are determined to ensure proper alignment. Based on this information, a corrective movement for the robot end-effector can be computed if the wire contact is not aligned with the wire contact insertion hole. According to an example embodiment, a designated wire contact insertion hole location is identified in two or more camera images is identified. The three-dimensional location "p" of the target hole in the end-effector coordinate system is then computed. To compute this location, an optimization algorithm is used that minimizes the sum of square distances between the target hole two-dimensional image locations and the projections of the three-dimensional location on to the camera images. A non-limiting example for an optimization includes Powell's method.

A location "r" is computed in the end-effector coordinate system that projects closest to the wire contact line in each image. This location is optionally constrained to lie in the plane of the connector surface. An optimization algorithm can be used to compute "r". Based on the resulting values of "p" and "r", the corrective movement may be computed as c=p−r. The movement of the end-effector can then be carried out.

The designated wire contact insertion hole of the connector for the wire contact is used to facilitate insertion of a wire contact into a respective wire contact insertion hole of the connector. In this regard, a wire is identified by a wiring diagram or the like to be inserted into a particular wire contact insertion hole of the connector with the particular wire contact insertion hole being identified by a contact ID number, which is identified on the connector via the aforementioned map of identifiers for the connector.

The process of aligning and inserting a wire into an available wire contact insertion hole of a connector as illustrated with respect to FIGS. 4 and 6 is achieved through clear visibility to the connector and the wire contact insertion holes therein. However, as a connector is built through the insertion of multiple wires into respective wire contact insertion holes, the visibility of the connector and available wire contact insertion holes diminishes drastically. Embodiments described herein overcome this issue using the separation device 119 of the robot end-effector 100 depicted in FIG. 4.

FIG. 7 illustrates the general process of aligning a wire contact with a designated wire contact insertion hole of a connector with reference to the system depicted in FIG. 4. After a wire 111 is grasped by the wire gripper 108 of the end-effector 100, whether the wire is placed in the wire gripper or picked-up by the wire gripper, images may be acquired by the cameras 102, 104 mounted on the end-effector at 150. In these images, the wire contact 114 is detected and its direction obtained as shown in 152. The robot may then move the wire contact 114 to be near the connector surface at 154. In this position, the cameras again acquire images at 156 to include the wire contact 114 and the connector 110. From these images, two processes are computed: first the direction of the wire contact is updated at 158; and second, connector holes are detected at 160. By combining the output of these processes, the system computes a movement command in the robot end-effector coordinates to align the contact with a designated wire contact insertion hole at 162.

According to some embodiments, iterative corrective movements may be performed to align the wire contact 114 with the designated wire contact insertion hole of the connector 110. To do so, after the robot executes the first alignment process illustrated in FIG. 7, camera images are again acquired, and both contact and target hole positions updated. If this update yields a corrective movement command below a threshold (e.g., below 0.1 millimeters), the robot may not execute the correction and instead proceeds to move the contact toward the connector surface. The direction of the movement of the wire contact toward the connector surface matches the contact's direction in three-dimensions as obtained through the camera images. If the updated wire contact position yields a correction above the threshold, the robot may then make the corrective move and acquire new images, whereby the aforementioned process is repeated until the correction is below the threshold.

The number of corrective iterations of the alignment process may be limited, such as to three attempts. After this limit, the robot may abort the alignment process and indicate an error, such as through an error message of a user interface. Alternatively, the robot may start again moving the contact near the connector surface as before.

The detection of the wire contact and the designated wire contact insertion hole are necessary to align the contact with a designated wire contact insertion hole and to understand the movement direction for the robot end-effector once the contact is aligned. However, designated wire contact insertion holes of a connector may become obscured by wires of previously-inserted wire contacts into the connector. The contact hole detection is imperative to properly identify the correct insertion hole of the connector into which the wire contact is to be inserted. In each camera image including the connector, contact insertion holes are detected.

Embodiments described herein provide a mechanism by which wires from previously inserted wire contacts of the connector are separated to provide a line-of-sight for the cameras to capture images of available wire contact insertion holes. FIG. 8 illustrates the end effector in more detail than the schematic of FIG. 4. As shown, the robot end effector 200 carried by a robot (not shown) includes a first camera 202, where a second camera may be positioned on an opposite side of the end effector for a second image capture angle. The end effector 200 further includes wire gripper 208 configured to grip a wire 211 including a wire contact 214. The separator device 219 is illustrated positioned ahead of the wire contact 214, between the wire contact 214 and the connector 210.

FIG. 9 illustrates another view of the end effector 200 including first camera 202 and a second camera 204, where the two cameras are arranged to capture images from different viewing angles of a wire contact 114 of a wire grasped by wire gripper 208. Further illustrated is the separating device 219 as described herein to facilitate visibility of the available wire contact insertion holes of a connector such that alignment and insertion of the wire contact can be carried out accurately and effectively.

Embodiments described above depend upon visual identification of available wire contact insertion holes for alignment and insertion of wire contacts into a connector. However, as illustrated in FIG. 10, connectors that have wires previously installed render identification of available wire contact insertion holes difficult. FIG. 10 illustrates two views of a plurality of wires 306 or a "wire bundle" extending from a connector 310. As shown, wire contact insertion holes are not apparent due to the plurality of wires 306 obfuscate any available wire contact insertion holes. Also illustrated in FIG. 10 is the wire gripper 308 along with wire 311 and wire contact 314, positioned to begin the alignment and insertion process. Further illustrated is the separating device 319, positioned with the wire gripper 308 above the plurality of wires 306. While example embodiments described herein generally depict the separation of two or more wires previously connected to a connector, the separator device of example embodiments can be used for as few as one previously connected wire, whereby a single wire may be previously connected to a connector, and the separator device can serve to push the single, previously connected wire away from a path of a wire contact to be installed.

The separating device 319 includes a first separating element 319A and a second separating element 319B as shown in FIG. 10. The process of inserting a wire contact 314 into an available wire contact insertion hole of the connector 310 begins as shown in FIG. 10 with the wire gripper 308 and the separating device 319 positioned above the plurality of wires 306. While the illustrated embodiment includes many wires in the plurality of wires, embodiments of the separating device 319 can be used with any number of wires already inserted into the connector 310. Further, as will be appreciated by one of ordinary skill in the art, the process described herein can be used with no wires previously connected to the connector without alteration; however, the separating device 319 will merely not have any wires to separate in such an operation. Thus, the process described herein can be used for the insertion of every wire contact into a connector without deviating from the process.

The wire gripper 308 and the wire separating device 319 illustrated in FIG. 10 are positioned vertically above an axis of insertion of the wire contact insertion hole into which the wire contact is to be inserted. While a connector can be assembled with wires and their respective wire contacts inserted into any available insertion hole when the wires do not differ among the plurality of wires, connector assembly often relies on selecting a particular wire and wire contact to be inserted into a specific, designated wire contact insertion hole. As such, when a wire is grasped by the wire gripper 308, a designated wire contact insertion hole is generally known from the array of wire contact insertion holes of the connector. Thus, the end-effector can position the wire gripper 308 and the wire separating device 319 directly above the axis along which the wire contact 314 will be inserted into the designated wire contact insertion hole. In this position illustrated in FIG. 10, the separating device 319 is position behind the wire gripper 308 relative to the connector 310.

FIG. 11 illustrates the separating device 319 moved from behind the wire gripper 308 relative to the connector 310 to a position in front of the wire gripper, between the wire gripper and the connector. According to some embodiments, the separating device 319 may begin in this position as the end-effector is moved into position above the axis of insertion of the wire contact 314 into the designated wire contact insertion hole.

FIG. 12 illustrates the next step of the process in which the end-effector descends and drives the separator device 319 including the first separating element 319A and the second separating element 319B into the plurality of wires 306, separating or parting the plurality of wires. The wire gripper 308 descends with the separator device 319 positioned laterally ahead of the wire gripper 308 relative to the connector 310 in order to protect the wire contact 14 from the plurality of wires 306 as the robot end-effector moves the wire contact 314 into position with the wire contact axially aligned with the designated wire contact insertion hole. The end-effector positions the wire gripper 308 such that the wire contact 314 is disposed along an axis of insertion into the connector 310. In this position, the wire contact 314 is axially aligned with the designated wire contact insertion hole. In this step of the process, the separating device 319 remains in front of the wire gripper 308 relative to the connector 310, with the point at which the first separating element 319A and the second separating element 319B positioned beneath the wire contact 314 to drive the plurality of wires 306 apart to accommodate the wire contact 314 in the position where the wire contact is axially aligned with the designated wire contact insertion hole.

The process continues with the wire contact insertion into the designated wire contact insertion hole. This process can follow the finite iterative alignment process described above with the cameras having visibility to the designated wire contact insertion hole due to the separation of the plurality of wires 306 using the separator device 319. According to an example embodiment, the three-dimensional position of the designated wire contact insertion hole can be projected onto the camera images, such as from the images from the cameras proximate the wire gripper. The projection provides an estimate of the hole location within the image. A computer-vision method finds a refined hole location given each camera image, such as through the process described above. Wire contact insertion holes within the connector can be identified from the images and listed, such as in a temporary memory. To refine the target hole location, the location in a list of wire contact insertion holes closest to the three-dimensional projection of the designated wire contact insertion hole is chosen for the visual, iterative alignment process. Embodiments optionally employ a maximum threshold distance of the closest wire contact insertion hole that is visually identified relative to the three-dimensional projection of the designated wire contact insertion hole. In such an embodiment, if a detected/identified closest wire contact insertion hole to the three-dimensional projection is more than a threshold distance away (e.g., 20 pixels), the controller aims for the projected location as the designated wire contact insertion hole without visual refinement. Projections and refinements can be computed for a multitude of cameras, preferably a pair of cameras proximate the wire gripper.

Given the multitude of wire contact insertion holes in an image, a robot end-effector displacement is optionally computed such that the line extending from the wire contact intersects with the designated wire contact insertion hole in each image. According to an example embodiment, images are captured, and displacements are computed and executed until the wire contact aligns with the designated wire contact insertion hole within a threshold distance, such as within 0.5 millimeters. Once alignment is performed, the wire gripper 308 is advanced toward the connector 310 by the robot end-effector, which carries with it the separator device 319 that moves in concert with the wire gripper 308. The wire gripper 308 inserts the wire contact 314 into the designated wire contact insertion hole of the connector.

FIG. 13 illustrates the next step in the process whereby the wire separation device moves relative to the wire gripper 308, with the first separating element 319A and the second separating element 319B moving from in front of the wire gripper 308 relative to the connector 310 to behind the wire gripper relative to the connector. Movement of the separator device 319 aft of the wire gripper 308 prevents the separator device from interfering with the wire contact insertion process, which can include a tip of the wire gripper 308 penetrating the grommet of the connector 310. The insertion process begins by moving the wire contact 314 toward the connector 310 surface until the wire contact tip enters the designated wire contact insertion hole of the connector.

The insertion of the wire contact 314 into the designated wire contact insertion hole is performed by the wire gripper 308 advancing toward the connector 310 with the wire contact 314 properly aligned with the designated wire contact insertion hole. FIG. 14 illustrates the wire gripper 308 advanced toward the connector 310 inserting the wire contact.

During insertion, the robot end effector and/or the wire gripper 308 may include one or more sensors for determining one or more forces acting on the wire 311 or the wire contact 314. Forces may be sensed by virtue of resistance encountered by the motive force of the robot (e.g., a servo motor, a hydraulic pump, etc.). Forces may optionally be sensed by a strain gauge arrangement which may be disposed on the wire gripper and configured to sense resistance to movement of the wire gripper or wire/wire contact held therein. Various other force sensing arrangements may be employed as necessary to determine forces acting on the wire contact 314 of the wire 311 held by the wire gripper 308.

During insertion, the robot end effector and/or wire gripper monitors the insertion force, F. If the force is above a predetermined value, for example 16 Newtons, a value which may be dependent on the type of contact and the type of connector, the insertion may be temporarily halted. Once temporarily halted, a determination is made with respect to the depth of the insertion. The insertion depth can is estimated based on the initial distance to the connector and the travel distance of the robot end effector. The initial distance can be estimated through vision, such as through the image processing described above identifying the location of the connector relative to the wire contact. If the depth of insertion d is above a minimum depth $d_{min}$, a pull test is conducted.

The pull test operation may be performed to confirm seating of the wire contact within the connector. For the pull test, the wire gripper may pull back on the wire, away from the connector, until a specific distance or force threshold is reached. If the force threshold is reached before the specified distance, then the wire contact is confirmed as properly seated. If the specified distance is reached before the force threshold is achieved, the wire insertion failed as the wire is determined to not be fully seated.

Once the wire contact 314 is inserted within the designated wire contact insertion hole and the wire contact is confirmed to be seated, the wire gripper 308 opens to release the wire 311, and the wire gripper along with the first separator element 319A and second separator element 319B move away from the connector 310 as shown in FIG. 15. The wire gripper 308 remains engaged about the wire as shown at 309. Next, the wire gripper 308 opens further as shown in FIG. 16 and the first separator element 319A and second separator element 319B move apart to further separate the plurality of wires 306 of the bundle. At this point, the wire gripper 308 is disengaged with the wire 311, and the robot end-effector moves vertically to disengage from the plurality of wires 306. This completes the insertion of the wire contact into the connector such that any additional wires can be retrieved and installed to complete the connector.

While the embodiment described above with respect to FIGS. 11 through 16 generally described the process of the robot end-effector aligning the wire contact directly above an axis along which the wire contact may be inserted into the designated wire contact insertion hole, according to some embodiments, access to the appropriate insertion path for a designated wire contact insertion hole is not from directly above the insertion path. Since embodiments described herein are configured to insert wire contacts into a connector when a plurality of wires are already connected to the connector, the path to an insertion axis along which a wire contact is inserted may need to avoid previously inserted wires. FIG. 17 illustrates an example embodiment of a connector 410 including wire contact insertion holes 412 and occupied wire contact insertion holes 414. A best available path to the designated wire contact insertion hole 416 of the illustrated embodiment is a straight line, but not one from directly above the connector 410. The path of the wire contact as carried by the wire gripper is computed such that the distance d between any point on the line and any hole filled with a wire is maximized. Said differently, the path is determined that provides the widest berth to the designated wire contact insertion hole. With the optimal line of the example embodiment, shown as line 420, at an angle α relative to the vertical, the robot end-effector with the wire gripper needs to be rotated at the same angle α relative to the vertical. The wire gripper is rotated before moving down along line 420 separating the previously inserted wires. Optionally, a best available path to the designated wire contact insertion hole may not be a straight line, but can include a curved path to efficiently avoid previously inserted wires of the connector.

When optimizing the approach angle as shown in FIG. 17, a constraint on the maximum angle is imposed to avoid collisions of the end-effector with other connector holders and devices used to manage the wire layout. An example maximum angle is 20-degrees. FIG. 18 illustrates a pseudo code for optimizing the approach angle. The movement path is constrained to a plane parallel to the connector surface and ends at the target hole, such that this path is uniquely defined by the approach angle.

FIG. 19 is a flowchart of a method for inserting a wire contact into a designated wire contact insertion hole of a connector that has two or more wires already connected to the connector. As shown, a robot having an end-effector is controlled to position a wire contact proximate to a connector using a wire gripper and a separator device of the end effector at 510. The robot is controlled to advance the separator device between two or more wires previously inserted into the connector at 520. At 530 the robot is controlled to align the wire contact with the designated wire contact insertion hole of the connector. The robot is controlled at 540 to advance the wire contact toward the designated wire contact insertion hole of the connector and at least partially insert the wire contact into the designated wire contact insertion hole. The robot is controlled at 550 to release the wire contact from the wire gripper. At 560, the robot is controlled to withdraw the wire gripper and the separator device from between the two or more wires previously connected to the connector.

As described above, FIGS. 7 and 19 illustrate flowcharts of a system, method, and computer program product according to example embodiments of the present disclosure. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory 38 of a system 30 employing an embodiment of the present disclosure and executed by the processing circuitry 36 of the system 30. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art having the benefit of the teachings presented in the foregoing descriptions and the associated drawings. Therefore, it is to be understood that the present application is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A system for automated insertion of a wire contact into a designated wire contact insertion hole of a connector, the system comprising:
   a robot having an end-effector, wherein the end-effector comprises a wire gripper holding the wire contact and a separator device; and
   a computing device, wherein the computing device is configured to:
      control the robot to advance the separator device past one in a first direction between two or more wires previously connected to the connector;
      control the robot to advance the separator device between the two or more wires previously connected to the connector in a second direction different from the first direction away from the connector, wherein the first direction is not coaxial with the second direction;
      control the robot to align the wire contact with the designated wire contact insertion hole of the connector;
      control the robot to advance the wire contact toward the designated wire contact insertion hole of the connector and at least partially insert the wire contact into the designated wire contact insertion hole;
      control the robot to release the wire contact from the wire gripper; and
      control the robot to withdraw the wire gripper and the separator device from between the two or more wires previously connected to the connector.

2. The system of claim 1, wherein the computing device configured to control the robot to advance the separator device in a first direction between two or more wires previously connected to the connector is further configured to:
   control the robot to advance the separator device from a first position relative to the wire gripper to a second position relative to the wire gripper, wherein the first position is further from the connector than the wire gripper, and wherein the second position is closer to the connector than the wire gripper; and
   control the robot to drive the separator device between the two or more wires in a position between the wire gripper and the connector.

3. The system of claim 2, wherein the computing device configured to control the robot to advance the separator device between the two or more wires previously connected to the connector is further configured to:
   control the robot to move the separator device from the second position relative to the wire gripper to the first position relative to the wire gripper with the separator device engaged with the two or more wires previously connected to the connector.

4. The system of claim 3, wherein the computing device configured to control the robot to advance the wire contact toward the designated wire contact insertion hole of the connector and at least partially insert the wire contact into the designated wire contact insertion hole further comprises causing the robot to:
   advance the wire contact toward the designated wire contact insertion hole of the connector and at least partially insert the wire contact into the designated wire contact insertion hole unobstructed by the two or more wires previously connected to the connector.

5. The system of claim 1, wherein the computing device is further configured to:
   determine positions of occupied wire contact insertion holes of the connector, wherein occupied wire contact insertion holes are occupied with the two or more wires previously connected to the connector; and
   identify a path to an insertion axis of the designated wire contact insertion hole of the connector, wherein the path is perpendicular to the insertion axis.

6. The system of claim 5, wherein the computing device configured to identify the path to the insertion axis of the designated wire contact insertion hole of the connector, wherein the path is perpendicular to the insertion axis, is further configured to:
   identify the path to the insertion axis of the designated wire contact insertion hole of the connector based on a maximum distance between the path and at least one of the occupied wire contact insertion holes of the connector.

7. The system of claim 6, wherein the computing device configured to identify the path to the insertion axis of the designated wire contact insertion hole of the connector, wherein the path is perpendicular to the insertion axis is further configured to:
   identify an angle of the path to the insertion axis of the designated wire contact insertion hole of the connector relative to a vertical axis, and
   control the robot to rotate to the angle of the path relative to the connector.

8. The system of claim 1, wherein the separator device comprises a first separator element and a second separator element, wherein the computing device configured to control the robot to advance the separator device between the two or more wires previously connected to the connector comprises the computing device configured to drive a point at which the first separator element meets the second separator element between the two or more wires previously connected to the connector along a path to an insertion axis of the designated wire contact insertion hole of the connector, wherein the path is perpendicular to the insertion axis.

9. A method for automated insertion of a wire contact into a designated wire contact insertion hole of a connector, the method comprising:
   controlling a robot to advance a separator device in a first direction between two or more wires previously connected to the connector;
   controlling the robot to advance the separator device between the two or more wires previously connected to the connector in a second direction different from the first direction away from the connector, wherein the first direction is not coaxial with the second direction;
   controlling the robot to align the wire contact with the designated wire contact insertion hole of the connector using a wire gripper;
   controlling the robot to advance the wire contact toward the designated wire contact insertion hole of the connector and at least partially insert the wire contact into the designated wire contact insertion hole;
   controlling the robot to release the wire contact from the wire gripper; and
   controlling the robot to withdraw the wire gripper and the separator device from between the two or more wires previously connected to the connector.

10. The method of claim 9, wherein controlling the robot to advance the separator device between the two or more wires previously connected to the connector comprises:
    controlling the robot to advance the separator device from a first position relative to the wire gripper to a second position relative to the wire gripper, wherein the first position is further from the connector than the wire gripper, and wherein the second position is closer to the connector than the wire gripper; and
    controlling the robot to drive the separator device between the two or more wires in a position between the wire gripper and the connector.

11. The method of claim 10, wherein controlling the robot to advance the separator device between the two or more wires previously connected to the connector further comprises:
    controlling the robot to move the separator device from the second position relative to the wire gripper to the first position relative to the wire gripper with the separator device engaged between the two or more wires previously connected to the connector.

12. The method of claim 11, wherein controlling the robot to advance the wire contact toward the designated wire contact insertion hole of the connector and at least partially insert the wire contact into the designated wire contact insertion hole further comprises:
    advancing the wire contact toward the designated wire contact insertion hole of the connector and at least partially inserting the wire contact into the designated wire contact insertion hole between the two or more wires previously connected to the connector.

13. The method of claim 9, further comprising:
    determining positions of occupied wire contact insertion holes of the connector, wherein occupied wire contact insertion holes are occupied with the two or more wires previously connected to the connector; and
    identifying a path to an insertion axis of the designated wire contact insertion hole of the connector, wherein the path is perpendicular to the insertion axis.

14. The method of claim 13, wherein identifying the path to the insertion axis of the designated wire contact insertion hole of the connector, wherein the path is perpendicular to the insertion axis, further comprises:
    identifying the path to the insertion axis of the designated wire contact insertion hole of the connector based on a maximum distance between the path and at least one of the occupied wire contact insertion holes of the connector.

15. The method of claim 14, wherein identifying the path to the insertion axis of the designated wire contact insertion hole of the connector, wherein the path is perpendicular to the insertion axis, further comprises:
    identifying an angle of the path to the insertion axis of the designated wire contact insertion hole of the connector relative to a vertical axis, and
    controlling the robot to rotate to the angle of the path relative to the connector.

16. The method of claim 9, wherein the separator device comprises a first separator element and a second separator element, wherein controlling the robot to advance the separator device between two or more wires previously connected to the connector comprises driving a point at which the first separator element meets the second separator element between the two or more wires previously connected to the connector along a path to an insertion axis of the designated wire contact insertion hole of the connector, wherein the path is perpendicular to the insertion axis.

17. An apparatus comprising at least one processor and at least one non-transitory memory including computer program code, the at least one non-transitory memory and computer program code configured to, with the processor, cause the apparatus to at least:
- control a robot to advance a separator device in a first direction between two or more wires previously connected to a connector;
- control the robot to advance the separator device between the two or more wires previously connected to the connector in a second direction different from the first direction away from the connector, wherein the first direction is not coaxial with the second direction;
- control the robot to align a wire contact with a designated wire contact insertion hole of the connector using a wire gripper;
- control the robot to advance the wire contact toward the designated wire contact insertion hole of the connector and at least partially insert the wire contact into the designated wire contact insertion hole;
- control the robot to release the wire contact from the wire gripper; and
- control the robot to withdraw the wire gripper and the separator device from between the two or more wires previously connected to the connector.

18. The apparatus of claim 17, wherein causing the apparatus to control the robot to advance the separator device between the two or more wires previously connected to the connector comprises causing the apparatus to:
- control the robot to advance the separator device from a first position relative to the wire gripper to a second position relative to the wire gripper, wherein the first position is further from the connector than the wire gripper, and wherein the second position is closer to the connector than the wire gripper; and
- control the robot to drive the separator device between the two or more wires in a position between the wire gripper and the connector.

19. The apparatus of claim 18, wherein causing the apparatus to control the robot to advance the separator device between the two or more wires previously connected to the connector further comprises causing the apparatus to:
- control the robot to move the separator device from the second position relative to the wire gripper to the first position relative to the wire gripper with the separator device engaged between the two or more wires previously connected to the connector.

20. The apparatus of claim 19, wherein causing the apparatus to control the robot to advance the wire contact toward the designated wire contact insertion hole of the connector and at least partially insert the wire contact into the designated wire contact insertion hole further comprises causing the apparatus to:
- advance the wire contact toward the designated wire contact insertion hole of the connector and at least partially insert the wire contact into the designated wire contact insertion hole between the two or more wires previously connected to the connector.

* * * * *